(12) United States Patent
Hur et al.

(10) Patent No.: US 12,423,871 B2
(45) Date of Patent: Sep. 23, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Hyejung Hur, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 18/020,828

(22) PCT Filed: Aug. 31, 2021

(86) PCT No.: PCT/KR2021/011635
§ 371 (c)(1),
(2) Date: Feb. 10, 2023

(87) PCT Pub. No.: WO2022/050650
PCT Pub. Date: Mar. 10, 2022

(65) Prior Publication Data
US 2023/0290006 A1    Sep. 14, 2023

(30) Foreign Application Priority Data

Sep. 3, 2020 (KR) .................. 10-2020-0112146

(51) Int. Cl.
*H04N 7/12* (2006.01)
*G06T 9/00* (2006.01)
(Continued)

(52) U.S. Cl.
CPC ............. *G06T 9/00* (2013.01); *H04N 19/521* (2014.11); *H04N 19/573* (2014.11); *H04N 19/577* (2014.11); *H04N 19/96* (2014.11)

(58) Field of Classification Search
CPC .. G06T 9/00; G06T 9/001; G06T 9/40; H04N 19/521; H04N 19/573; H04N 19/577;
(Continued)

(56) References Cited

U.S. PATENT DOCUMENTS 11,381,840 B2 *  7/2022 Zhang ................... H04N 19/70
2014/0245231 A1 *  8/2014 Cha ......................... G06T 17/10
                                                                   715/848
(Continued)

FOREIGN PATENT DOCUMENTS

KR    10-2019-0035678 A    4/2019
KR    10-2020-0057077 A    5/2020
(Continued)

*Primary Examiner* — Gims S Philippe
(74) *Attorney, Agent, or Firm* — Bryan Cave Leighton Paisner LLP

(57) ABSTRACT

A point cloud data transmission method according to embodiments may comprise the steps of: encoding point cloud data; and transmitting a bitstream including the point cloud data. A point cloud data reception device according to embodiments may comprise: a reception unit for receiving a bitstream including point cloud data; and a decoder for decoding the point cloud data.

20 Claims, 31 Drawing Sheets

(51) Int. Cl.
  *H04N 19/513* (2014.01)
  *H04N 19/573* (2014.01)
  *H04N 19/577* (2014.01)
  *H04N 19/96* (2014.01)

(58) Field of Classification Search
  CPC .... H04N 19/96; H04N 19/124; H04N 19/184;
           H04N 19/46; H04N 19/597; H04N 19/60;
                   H04N 19/70; H04N 19/513
  See application file for complete search history.

(56)         References Cited

U.S. PATENT DOCUMENTS

| | | | |
|---|---|---|---|
| 2019/0080483 A1* | 3/2019 | Mammou | G06T 3/4007 |
| 2019/0087979 A1* | 3/2019 | Mammou | H04N 19/597 |
| 2020/0043182 A1* | 2/2020 | Janus | G06T 17/00 |
| 2020/0053391 A1* | 2/2020 | Mammou | H04N 19/132 |
| 2020/0056576 A1* | 2/2020 | Oh | F03B 9/005 |
| 2021/0099711 A1* | 4/2021 | Tourapis | H04N 19/147 |
| 2021/0319593 A1* | 10/2021 | Flynn | H03M 7/6029 |
| 2022/0067981 A1* | 3/2022 | Zhang | G06T 9/004 |
| 2022/0124374 A1* | 4/2022 | Zhang | G06T 9/001 |

FOREIGN PATENT DOCUMENTS

| | | |
|---|---|---|
| KR | 10-2020-0092418 A | 8/2020 |
| WO | 2020/055869 A1 | 3/2020 |
| WO | 2020/138464 A1 | 11/2021 |

\* cited by examiner

FIG. 6
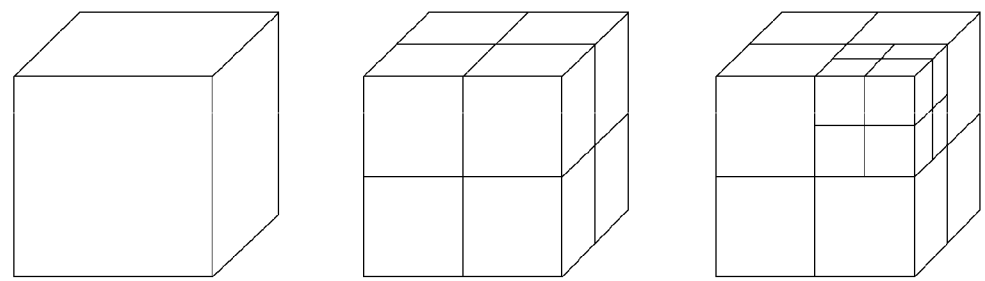
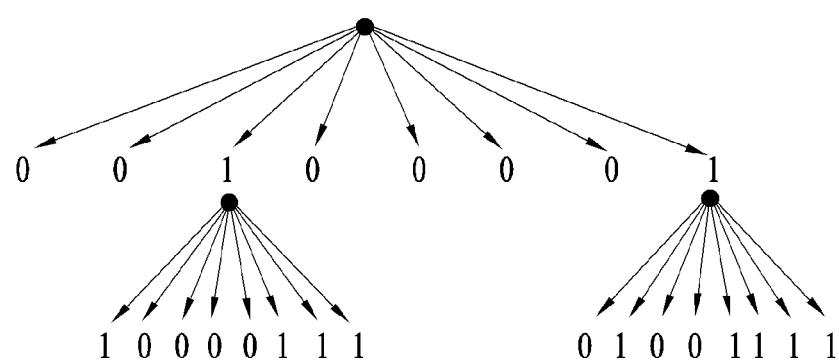

FIG. 7
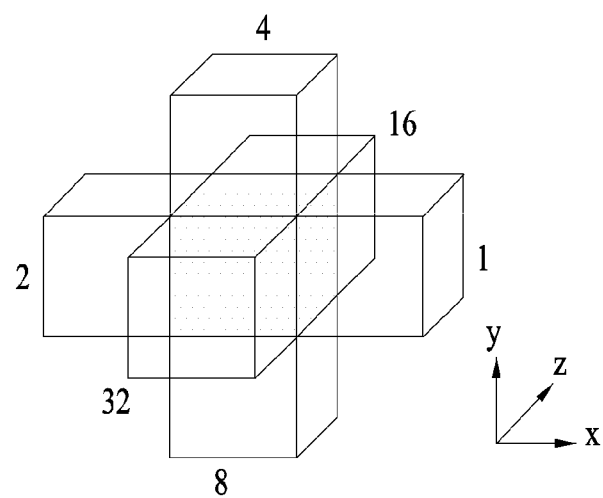
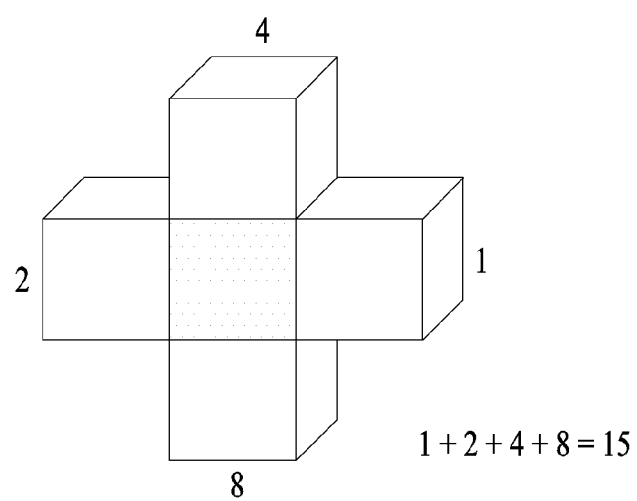
$1 + 2 + 4 + 8 = 15$

FIG. 20

| S P S | G P S | A P S 0 | A P S 1 | T P S | Slice0 | | | | | | | | ... |
|---|---|---|---|---|---|---|---|---|---|---|---|---|---|
| | | | | | Geom0 | | | | Attr0 | | | Attr1 | |
| | | | | | Geom slice header | Geom PU0 | | Geom PU1 | ... | Attr slice header | Attr PU0 | | Attr PU0 | ... |
| | | | | | | Geom PU Header | Geom PU data | | | | Attr PU header | Attr PU data | | |

FIG. 21

| geometry_parameter_set_rbsp( ) { | Descriptor |
|---|---|
|   gps_geom_parameter_set_id | ue(v) |
|   gps_seq_parameter_set_id | ue(v) |
|   ... | |
|   gps_frame_type | u(2) |
|   gps_frame_encoding_type | u(1) |
|   if (gps_frame_encoding_type ==1 ) { | |
|     inter_PU_size_type | u(2) |
|     if (inter_PU_size_type ==0) { | |
|     for (k=0; k<3; k++) | |
|       inter_global_motion_vector[k] | ue(v) |
|     } | |
|     inter_geom_error_residuals_exist_flag | u(1) |
|     if (inter_geom_error_residuals_exist_flag) | |
|       inter_geom_error_residuals_coding_type | u(1) |
|   } | |
| | |
|   ... | |
|   byte_alignment( ) | |
| } | |

FIG. 22

| attribute_parameter_set( ) { | Descriptor |
|---|---|
|     aps_attr_parameter_set_id | ue(v) |
|     aps_seq_parameter_set_id | ue(v) |
|   ... | |
|     isLifting = ( attr_coding_type == 0 \|\| attr_coding_type == 2 ) ? 1 : 0 | |
|     if( isLifting ) { | |
|         lifting_num_pred_nearest_neighbours | ue(v) |
|         lifting_max_num_direct_predictors | ue(v) |
|   ... | |
| aps_frame_type | u(2) |
|  aps_frame_encoding_type | u(1) |
|  if (aps_frame_encoding_type ==1 ) { | |
|    inter_PU_size_type | u(2) |
| if (inter_PU_size_type ==0) { | |
|   for (k=0; k<3; k++) | |
| inter_global_motion_vector[k] | ue(v) |
|   } | |
|   inter_attr_error_residuals_exist_flag | u(1) |
|  } | |
| | |
|   ... | |
|     byte_alignment( ) | |
| } | |

FIG. 23

| tile_parameter_set( ) { | Descriptor |
|---|---|
|   num_tiles | ue(v) |
|   for( i = 0; i < num_tiles; i++ ) { | |
|     tile_bounding_box_offset_x[ i ] | se(v) |
|     tile_bounding_box_offset_y[ i ] | se(v) |
|     ... | |
|   tile_frame_encoding_type | u(1) |
|   if (tile_frame_encoding_type == 1 ) { | |
|     inter_PU_size_type | u(2) |
|     if (inter_PU_size_type ==0) { | |
|     for (k=0; k<3; k++) | |
|       inter_global_motion_vector[k] | ue(v) |
|     } | |
|     inter_geom_error_residuals_exist_flag | u(1) |
|     if (inter_geom_error_residuals_exist_flag) | |
|       inter_geom_error_residuals_coding_type | u(1) |
|     inter_attr_error_residuals_exist_flag | u(1) |
|   } | |
|   ... | |
|   } | |
|   byte_alignment( ) | |
| } | |

FIG. 24

| geometry_slice_header( ) { | Descriptor |
|---|---|
| gsh_geometry_parameter_set_id | ue(v) |
| gsh_tile_id | ue(v) |
| gsh_slice_id | ue(v) |
| ... | |
| gsh_frame_encoding_type | u(1) |
| if (gsh_frame_encoding_type ==1 ) { | |
| inter_PU_size_type | u(2) |
| if (inter_PU_size_type ==0) { | |
| for (k=0; k<3; k++) | |
| inter_global_motion_vector[k] | ue(v) |
| } | |
| inter_geom_error_residuals_exist_flag | u(1) |
| if (inter_geom_error_residuals_exist_flag) | |
| inter_geom_error_residuals_coding_type | u(1) |
| } | |
| ... | |
| } | |
| byte_alignment( ) | |
| } | |

FIG. 25

| attribute_slice_header( ) { | Descriptor |
|---|---|
|   ash_attr_parameter_set_id | ue(v) |
|   ash_attr_sps_attr_idx | ue(v) |
|   ash_attr_geom_slice_id | ue(v) |
|   ... | |
|   ash_frame_encoding_type | u(1) |
|   if (ash_frame_encoding_type ==1 ) { | |
|     inter_PU_size_type | u(2) |
|     if (inter_PU_size_type ==0) { | |
|     for (k=0; k<3; k++) | |
|       inter_global_motion_vector[k] | ue(v) |
|     } | |
|     inter_attr_error_residuals_exist_flag | u(1) |
|   } | |
|   ... | |
|   } | |
|   byte_alignment( ) | |
| } | |

FIG. 26

| geom_pu_header( ) { | Descriptor |
|---|---|
| pu_tile_id | ue(v) |
| pu_slice_id | ue(v) |
| pu_cnt | u(16) |
| for( puIdx =0; puIdx < pu_cnt; puIdx++) { | |
|   pu_id[puIdx] | ue(v) |
|   for(k=0; k<3; k++) | u(2) |
|     pu_bounding_box_offset_xyz[ pu_id ][ k ] | s(v) |
|   for (k=0; k<3; k++) | |
|     pu_bounding_box_size_xyz[ pu_id ][ k ] | u(v) |
|   if( inter_error_residuals_coding_type == 0) { | |
|     pu_octree_level[ pu_id ] | u(v) |
|     pu_octree_mc[ pu_id ] | u(v) |
|   } | |
|   for(k=0; k<3; k++) | |
|     pu_local_motion_vector[ pu_id ][ k ] | u(v) |
|   pu_geometry_error_residuals_exist_flag | u(1) |
| } | |
|   for (k=0; k<3; k++) | |
|     pu_origin_xyz[ pu_id ][ k ] | se(v) |
| pu_origin_log2_scale | |
| } | |
| byte_alignment( ) | |
| } | |

FIG. 27

| attr_pu_header( ) { | Descriptor |
|---|---|
| pu_tile_id | ue(v) |
| pu_slice_id | ue(v) |
| pu_cnt | u(16) |
|   for( puIdx =0; puIdx < pu_cnt; puIdx++) { | |
|     pu_id[puIdx] | ue(v) |
|     for(k=0; k<3; k++) | u(2) |
|       pu_bounding_box_offset_xyz[ pu_id ][ k ] | s(v) |
|     for (k=0; k<3; k++) | |
|       pu_bounding_box_size_xyz[ pu_id ][ k ] | u(v) |
|     if( inter_error_residuals_coding_type == 0) { | |
|       pu_octree_level[ pu_id ] | u(v) |
|       pu_octree_mc[ pu_id ] | u(v) |
|     } | |
|     for(k=0; k<3; k++) | |
|       pu_local_motion_vector[ pu_id ][ k ] | u(v) |
|     pu_attr_error_residuals_exist_flag | u(1) |
|   } | |
|   for (k=0; k<3; k++) | |
|     pu_origin_xyz[ pu_id ][ k ] | se(v) |
| pu_origin_log2_scale | |
| } | |
| byte_alignment( ) | |
| } | |

FIG. 28

| geometry_pu_data( ) { | Descriptor |
|---|---|
|   pu_id | ue(v) |
|   pu_num_pts | u(v) |
|   if (gsh_frame_encoding_type == 0) { | |
|     // intra coding | |
|     ... | |
| | |
|   } else { | |
|     if (inter_geom_error_residuals_exist_flag) { | |
|       if (inter_geom_error_residuals_coding_type == 0) { | |
|         for( depth = 0; depth <= geom_tree_depth_minus1; depth++ ) { | |
|           residual_occupancy_bits [depth] | ue(v) |
|         } | |
|       } else if (inter_geom_error_residuals_coding_type == 1) { | |
|         for( idx = 0; idx < pu_num_pts; idx++ ) { | |
|           for (k=0; k<3; k++) | |
|             residual_positions[idx][k] | ue(v) |
|         } | |
|       } | |
|     } | |
|   } | |

FIG. 29

| attribute_pu_data( ) { | Descriptor |
|---|---|
|   pu_id | ue(v) |
|   pu_num_pts | u(v) |
|   if (ash_frame_encoding_type == 0) { | |
|     // intra coding | |
|     ... | |
| | |
|   } else { | |
|     if (inter_attr_error_residuals_exist_flag) { | |
|       AttrDim = attribute_dimension_minus1[ash_attr_sps_attr_idx] + 1 | |
|       for( idx = 0; idx < pu_num_pts; idx++ ) { | |
|         for (k=0; k< AttrDim; k++) | |
|           residual_attributes[idx][k] | ue(v) |
|       } | |
|     } | |
|   } | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application is the National Stage filing under 35 U.S.C. 371 of International Application No. PCT/KR2021/011635, filed on Aug. 31, 2021, which claims the benefit of earlier filing date and right of priority to Korean Patent Application No. 10-2020-0112146, filed on Sep. 3, 2020, the contents of which are all incorporated by reference herein in their entireties.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 20 illustrates a structure of a bitstream containing point cloud data according to embodiments.

FIG. 21 shows a geometry parameter set according to embodiments;

FIG. 22 shows an attribute parameter set according to embodiments;

FIG. 23 shows a tile parameter set according to embodiments;

FIG. 24 shows a geometry slice header according to embodiments;

FIG. 25 shows an attribute slice header according to embodiments;

FIG. 26 shows a geometry PU header according to embodiments;

FIG. 27 shows an attribute PU header according to embodiments.

FIG. 28 shows geometry PU data according to embodiments;

FIG. 29 shows attribute PU data according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
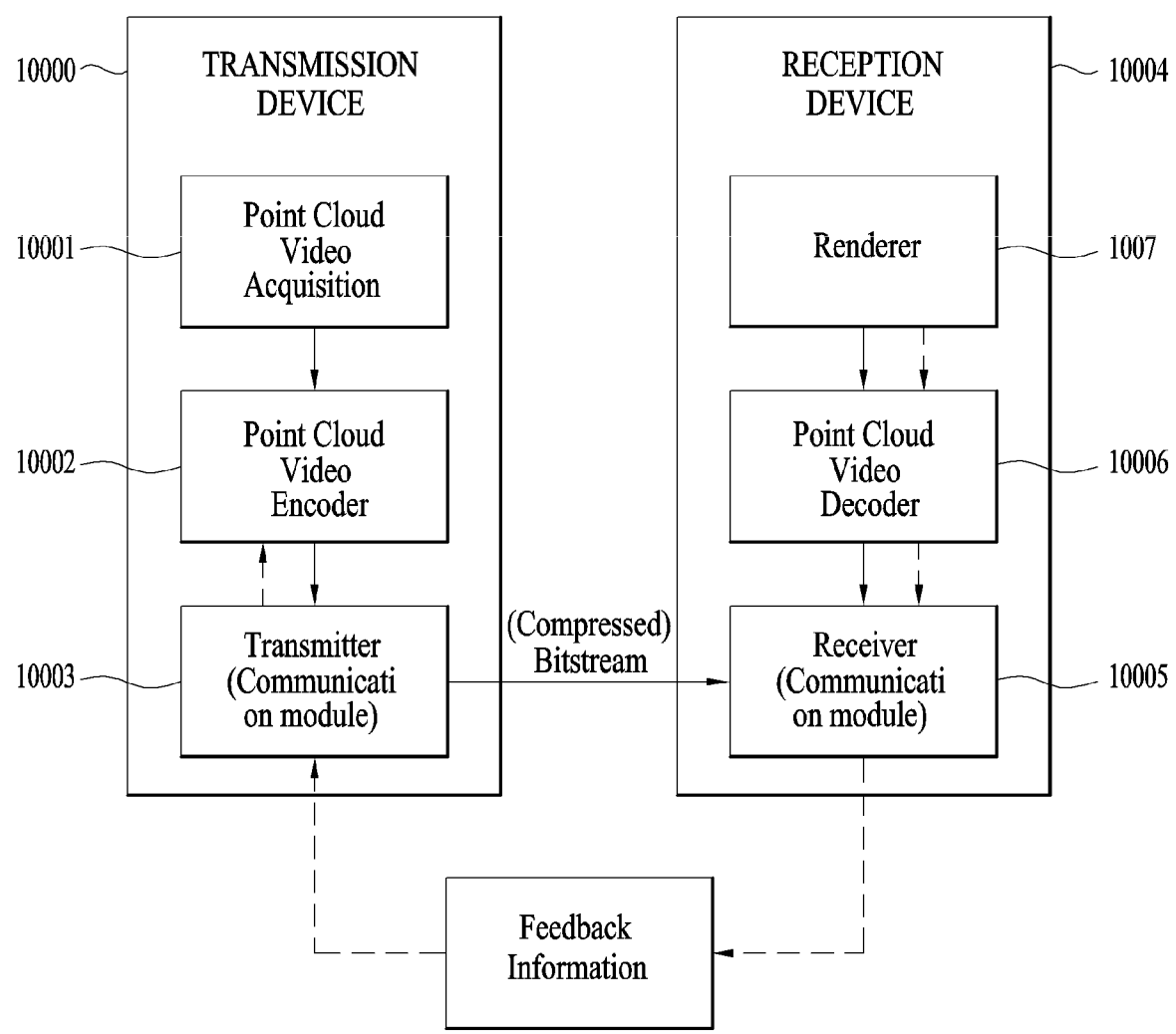
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
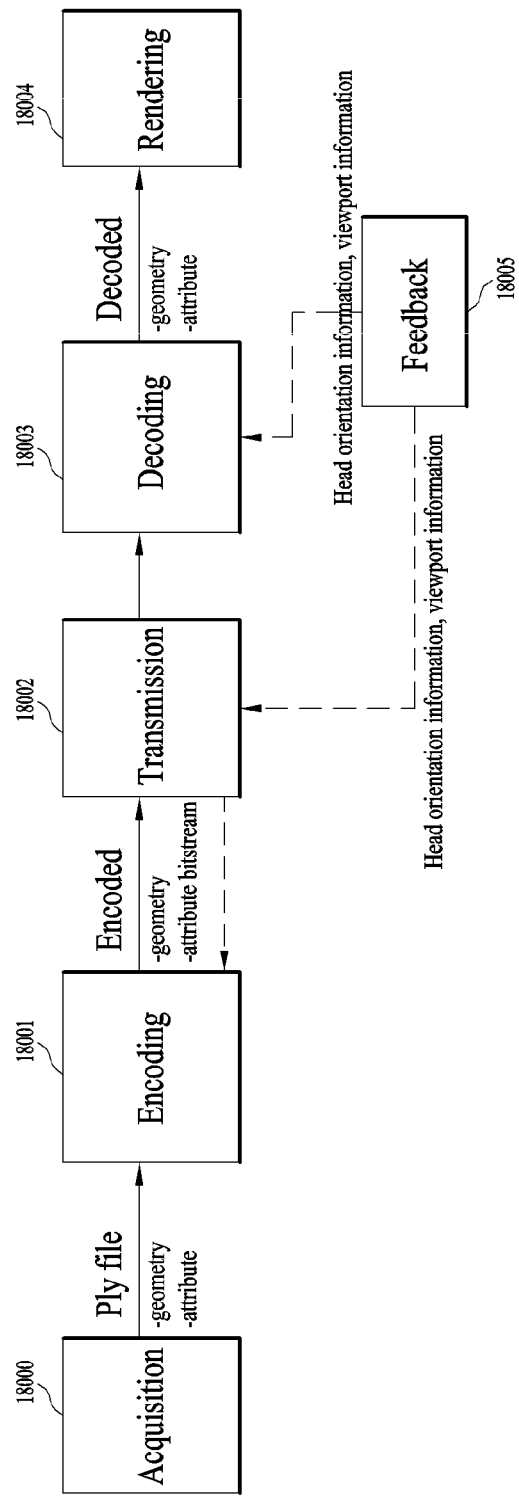
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
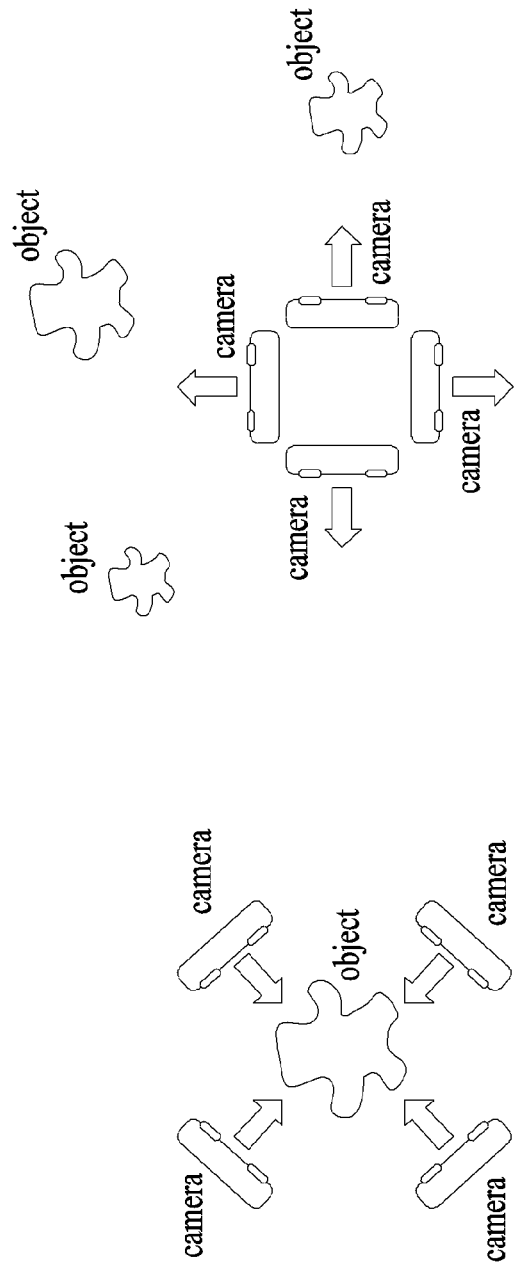
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
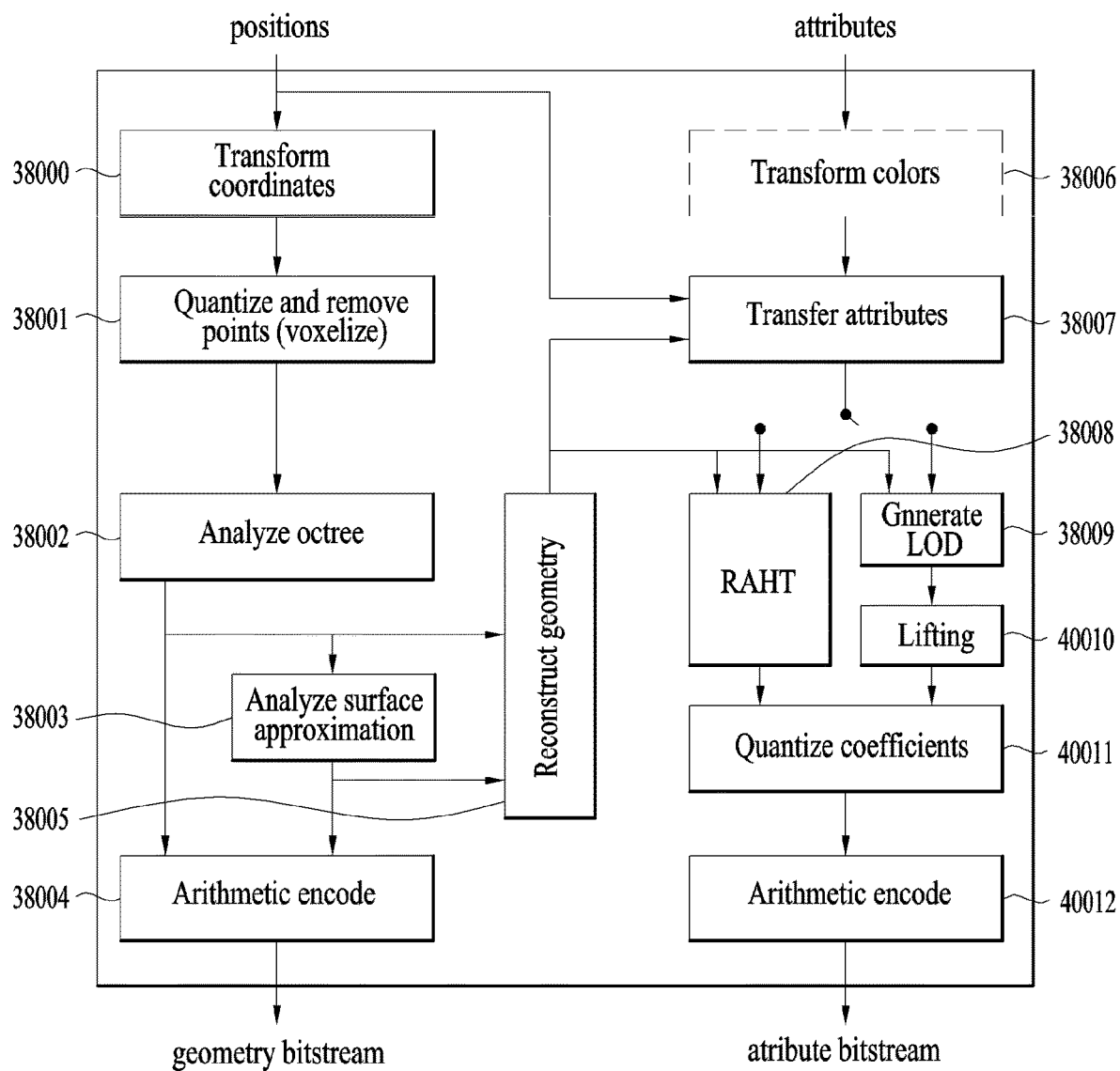
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates all representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
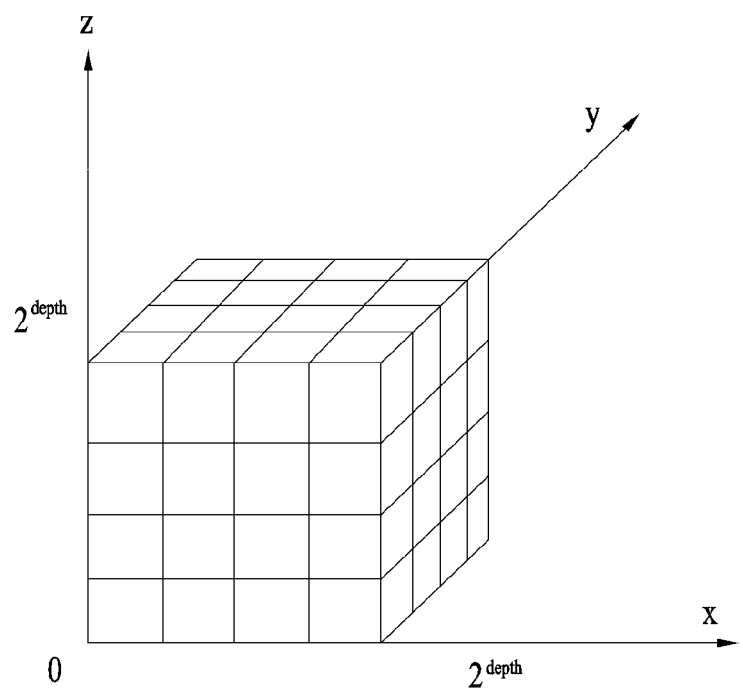
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d = \text{Ceil}(\text{Log } 2(\text{Max}(x^{int}_n, y^{int}_n, z^{int}_n, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad \text{i)}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \quad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
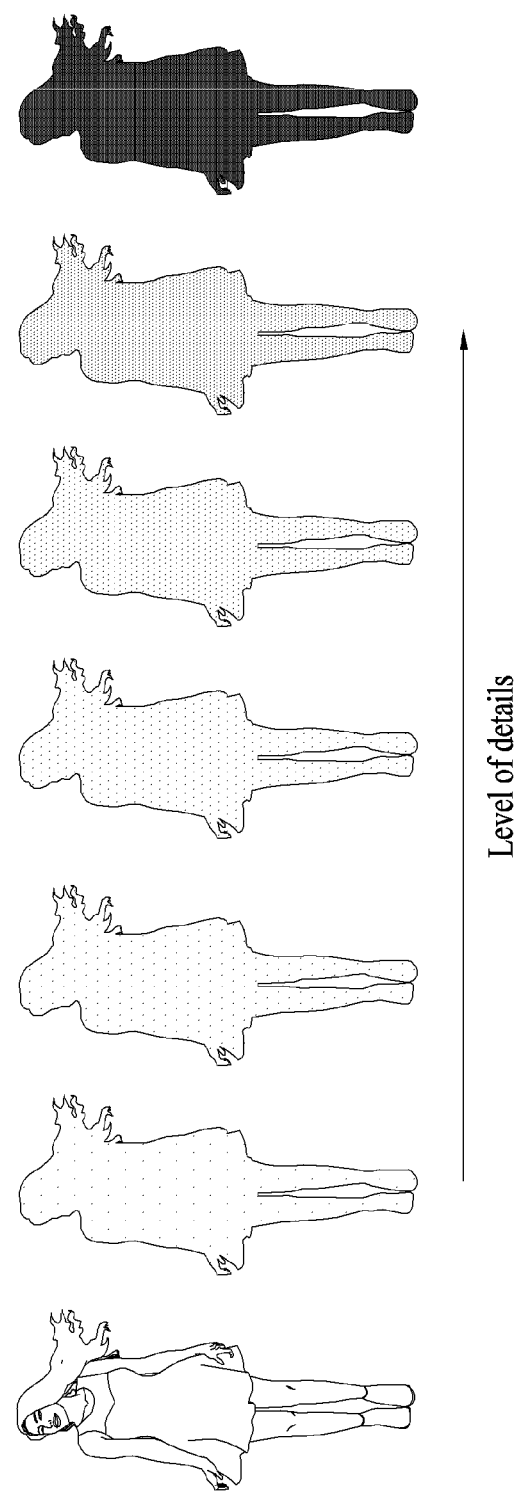
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
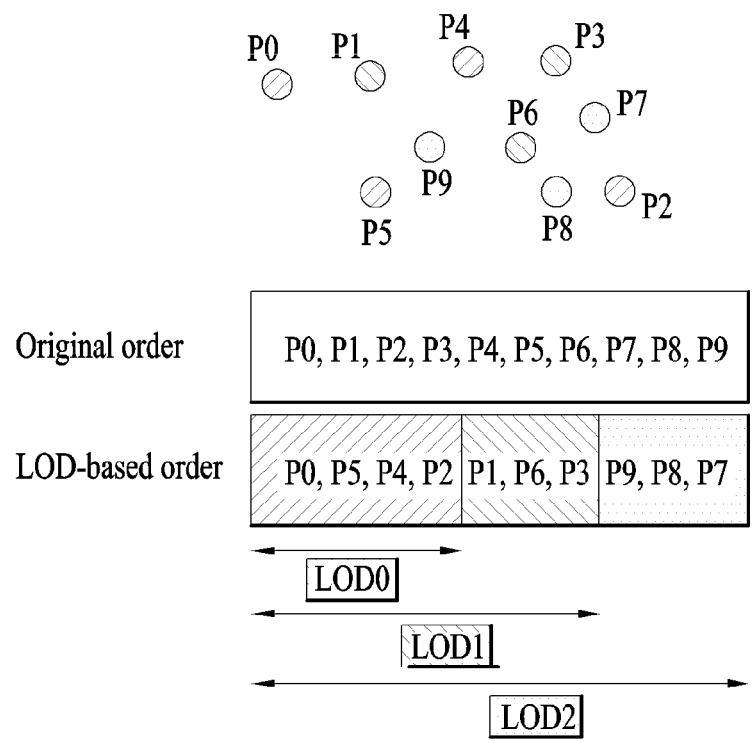
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE Attribute prediction residuals quantization pseudo code
```
int PCCQuantization(int value, int quantStep) {
if( value >=0) {
return floor(value / quantStep + 1.0 / 3.0);
} else {
return -floor(-value / quantStep + 1.0 / 3.0);
}
}
```
TABLE Attribute prediction residuals inverse quantization pseudo code
```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are w1=$w_{l_{2x,y,z}}$ and w2=$w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix}$$

Figure 10:
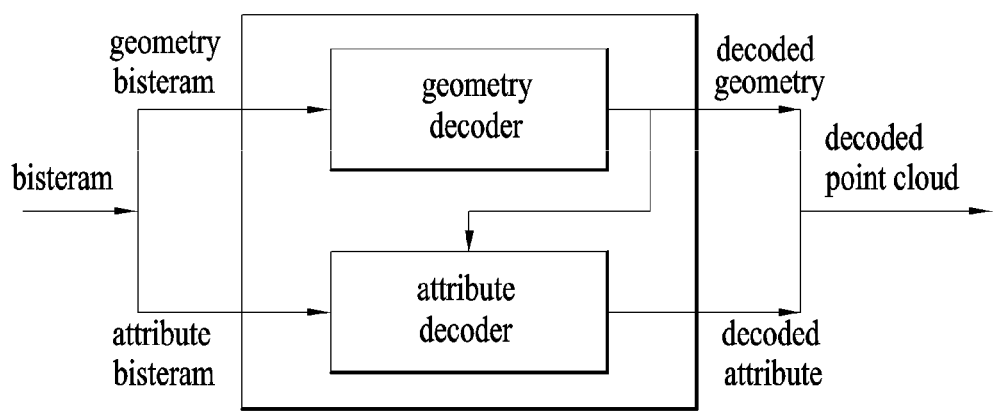
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
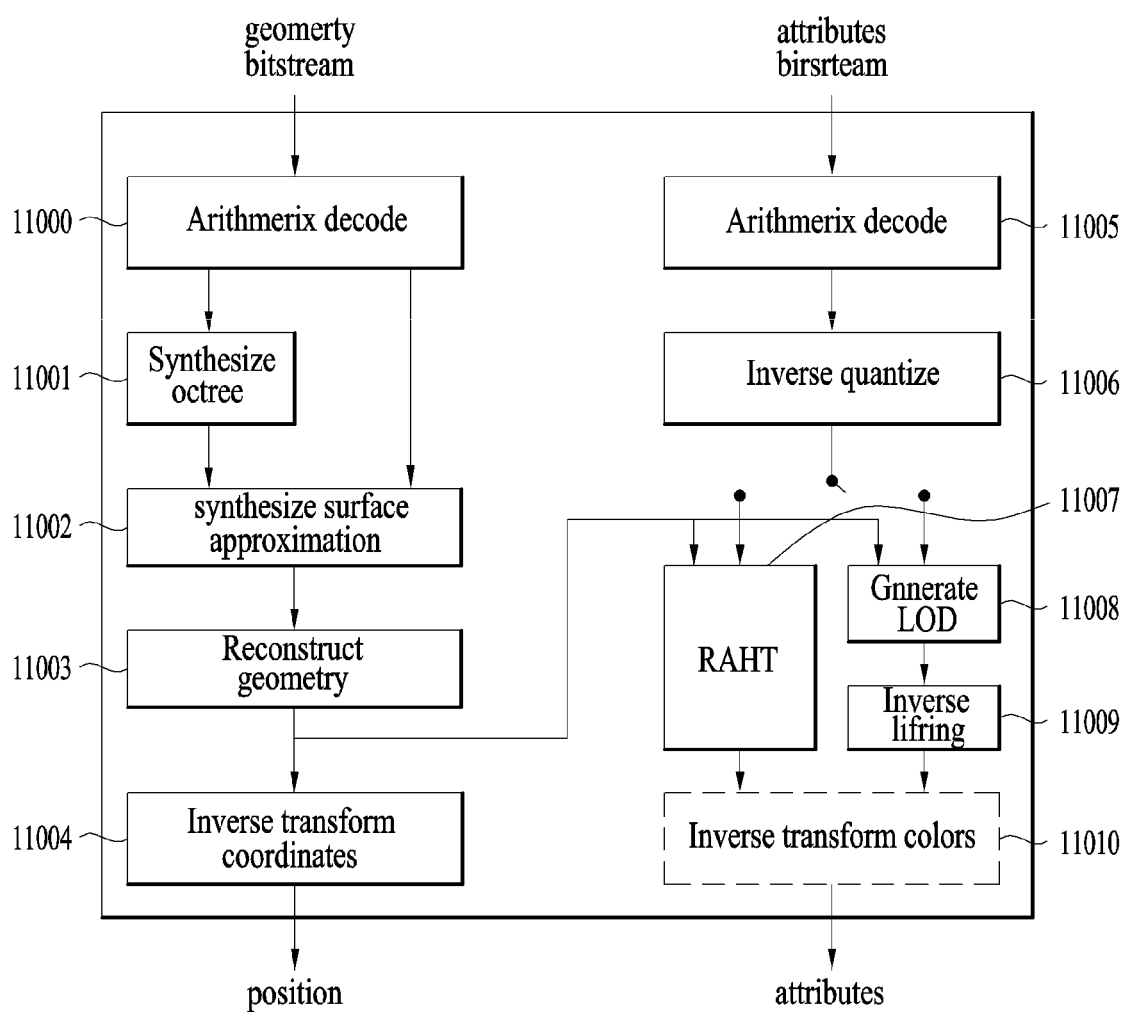
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
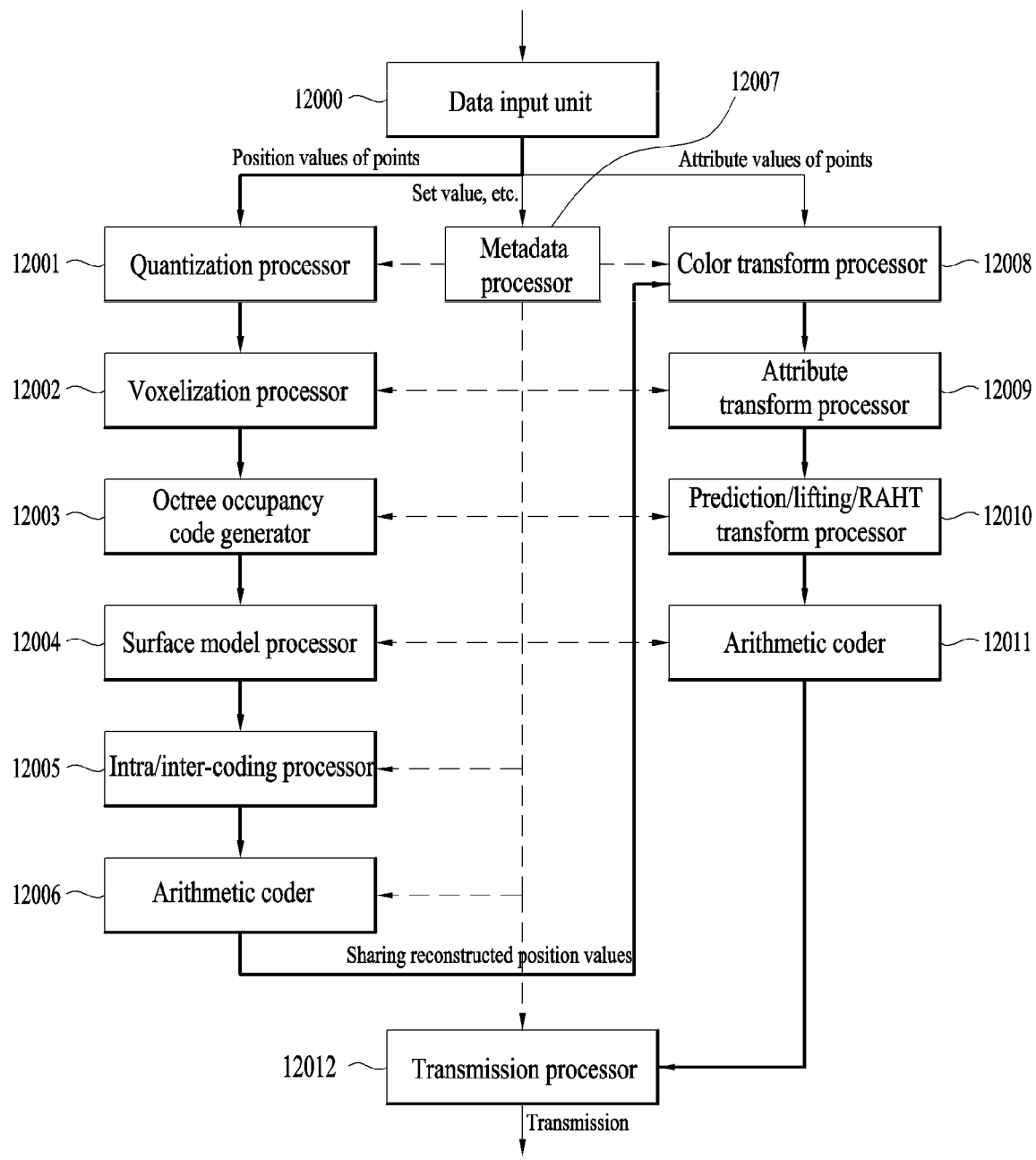
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
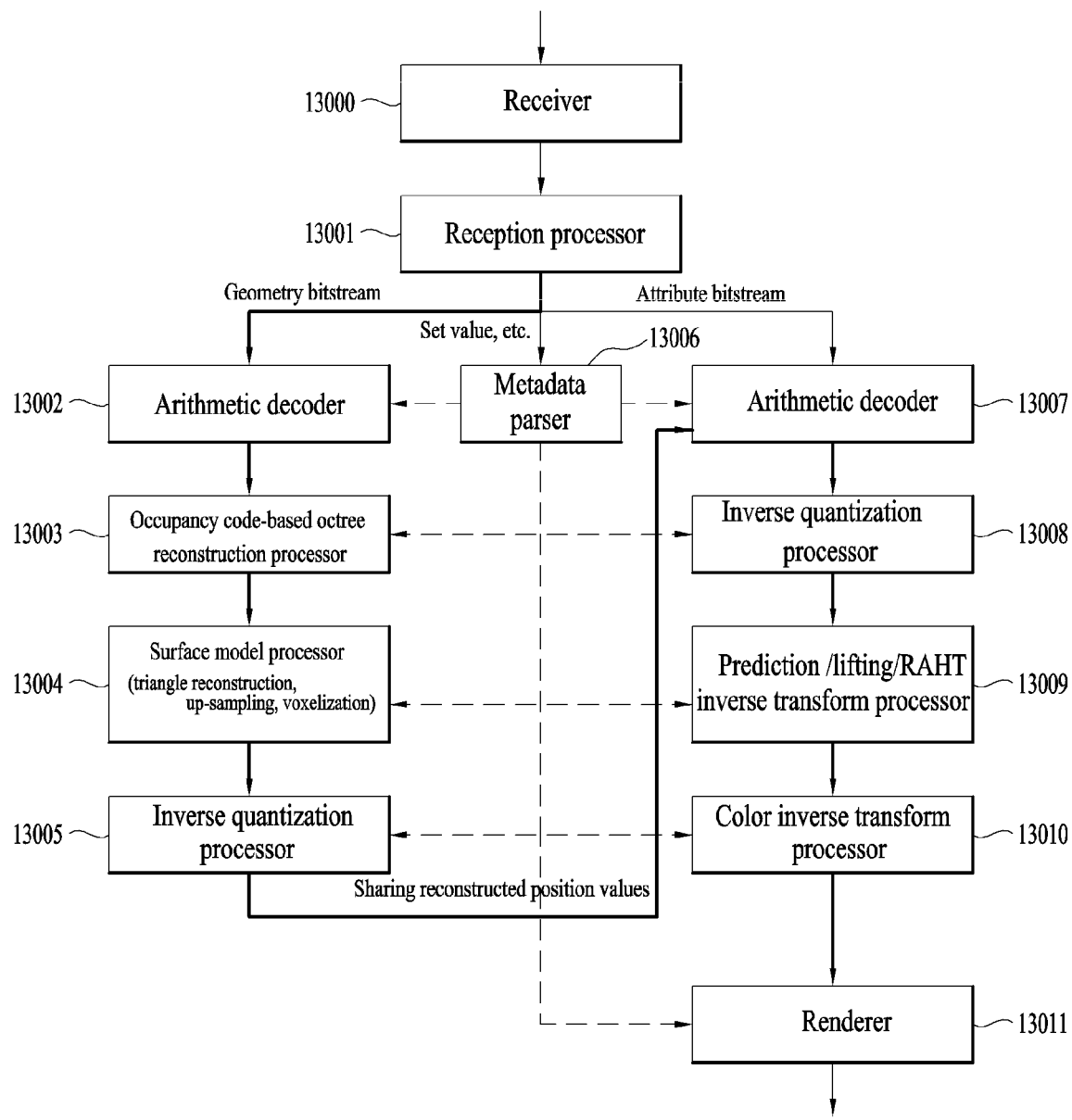
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
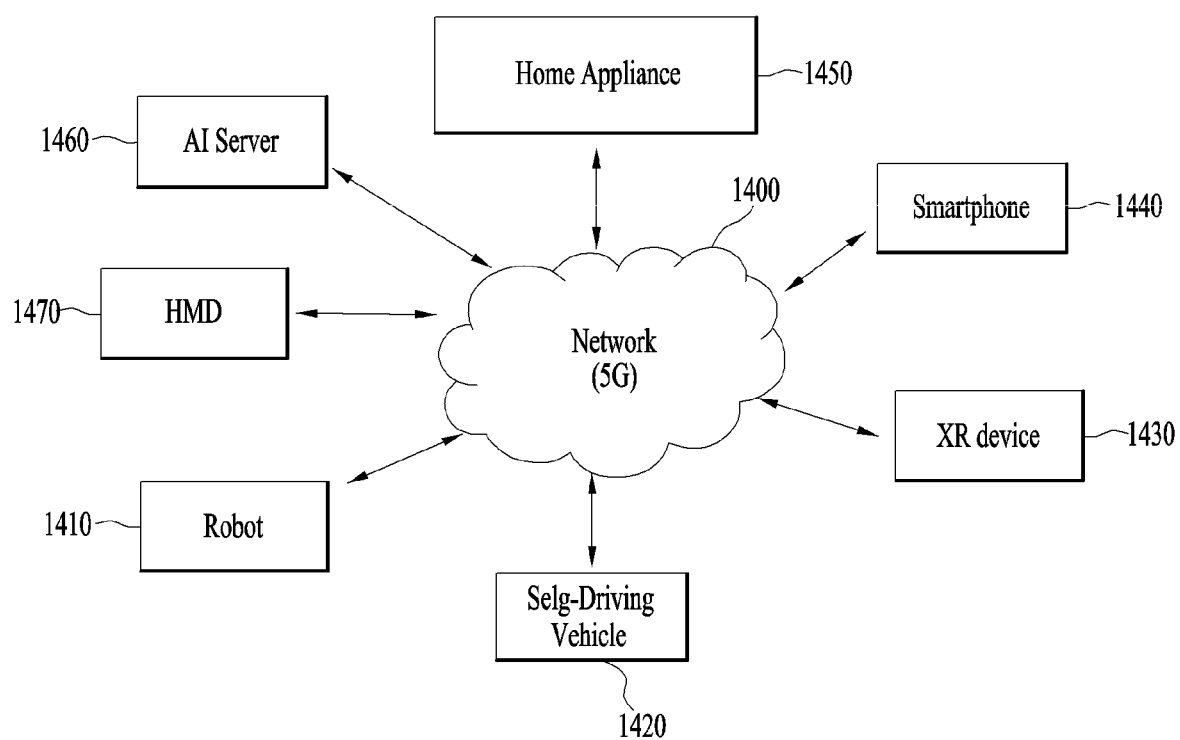
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 18:
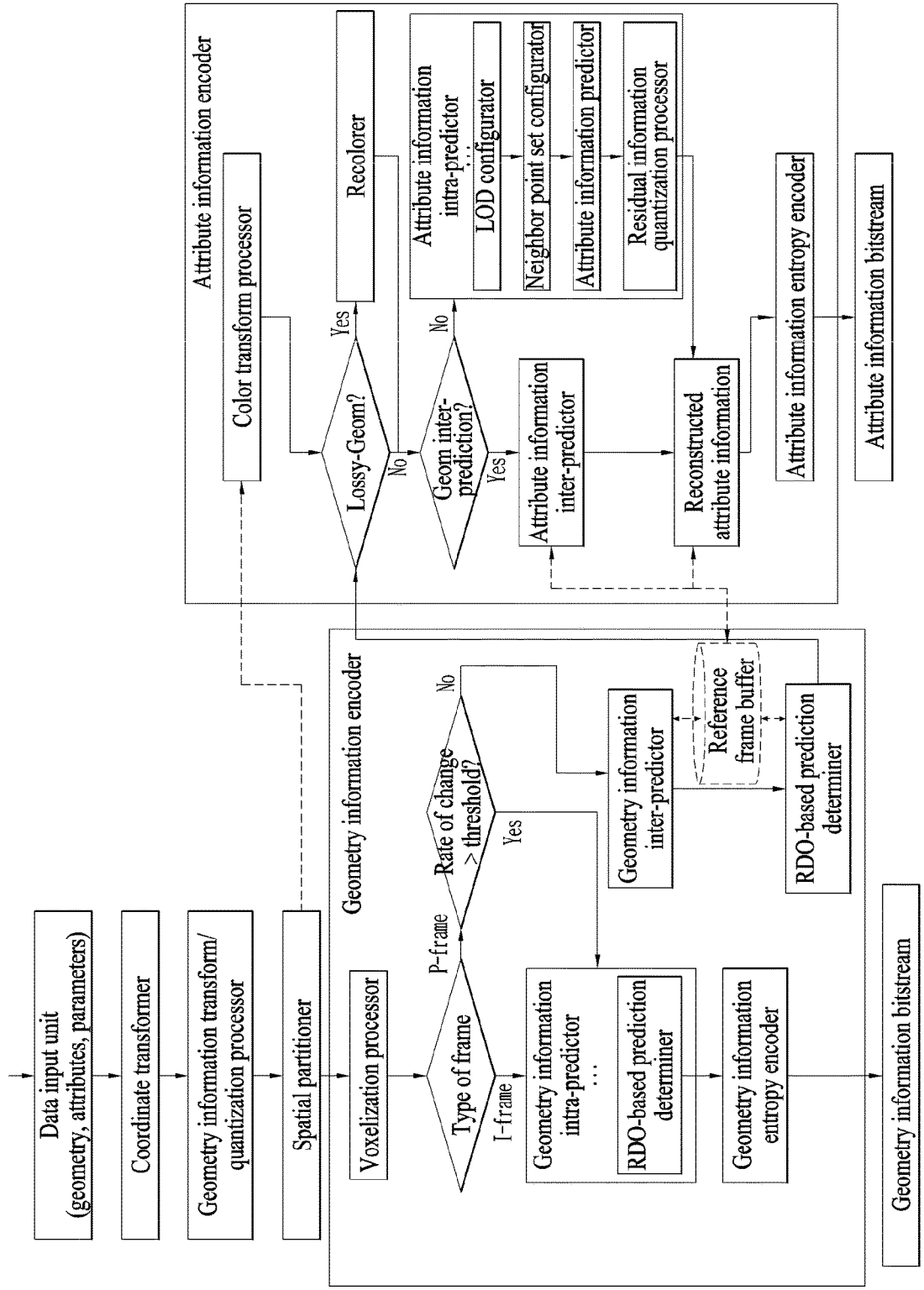
FIG. 18 illustrates a point cloud data transmission device according to embodiments.
Figure 30:
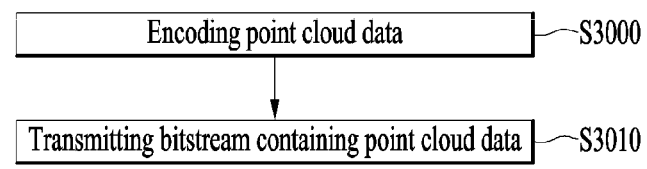
FIG. 30 illustrates a method of transmitting point cloud data according to embodiments.

The point cloud data transmission method/device according to embodiments may be construed as a term referring to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission method of FIG. 30, and the like.

Figure 19:
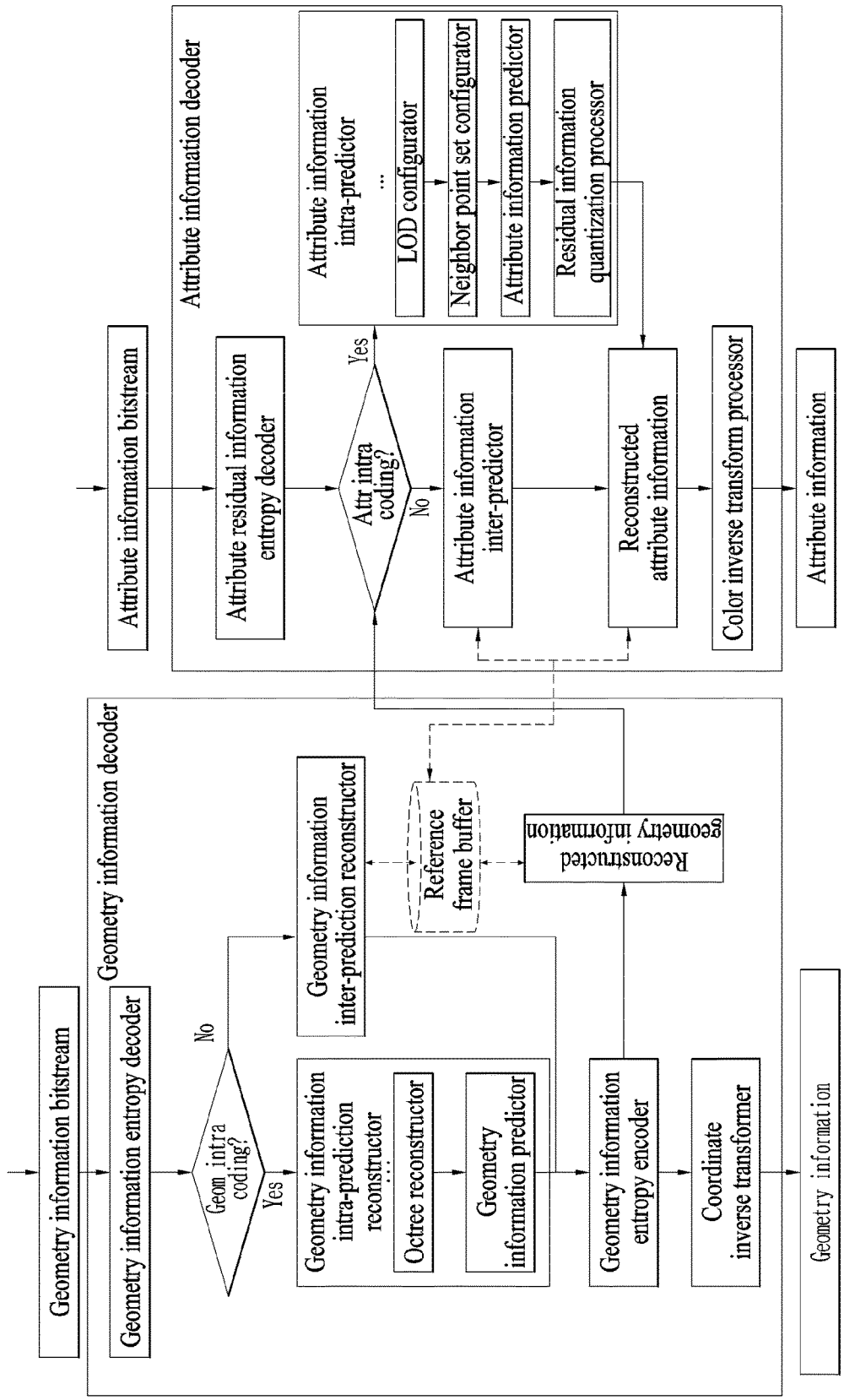
FIG. 19 illustrates a point cloud data reception device according to embodiments.
Figure 31:
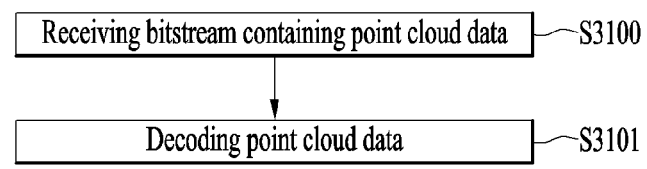
FIG. 31 illustrates a method of receiving point cloud data according to embodiments.

The point cloud data reception method/device according to embodiments may be construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception method of FIG. 31, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

The method/device according to embodiments may perform inter-prediction on point cloud data (which may be referred to simply as a point cloud) to compress and reconstruct the point cloud data.

For example, the method/device according to embodiments may perform inter-prediction coding of geometry-based point cloud compression (G-PCC) for compression/reconstruction of 3D point cloud data.

Specifically, the present disclosure proposes 1) a geometry inter-prediction scheme, 2) an attribute inter-prediction scheme, and 3) a signaling scheme to support the schemes.

A point cloud according to embodiments is composed of a set of points, and each of the points may have geometry information and attribute information. The geometry information is three-dimensional position (XYZ) information, and the attribute information includes a color (RGB, YUV, etc.) and/or a reflection value. The G-PCC encoding operation may include compressing geometry and compressing attribute information based on a geometry reconstructed according to position information changed through the compression (wherein reconstructed geometry=decoded geometry). The G-PCC decoding operation may include receiving an encoded geometry bitstream and attribute bitstream, decoding geometry, and decoding attribute information based on the geometry reconstructed through the decoding.

Accordingly, the method/device according to the embodiments may efficiently compress and reconstruct 3D point cloud data having multiple frames over time based on the inter-prediction coding scheme.

Regarding the inter-prediction according to the embodiments, definitions of the following terms will be described.

1. Configuration of Multiple Frames

Point cloud data may include multiple frames that vary over time. In this case, inter-prediction coding may be performed.

1) I (Intra), P (Predicted), and B (Bidirectional) Frames

Frames to be encoded/decoded may be divided into I (Intra) frames, P (Predicted: inter prediction) frames, and B (Bidirectional) frames. These units may be referred to as frames or pictures.

For example, the frames may be transmitted in order of I frame→P frame→(B frame)*→(I frame|P frame)+→ . . . . The B frame may be omitted.

2) Reference Frame

A reference frame may be a frame involved in encoding/decoding a current frame.

An immediately preceding I frame or P frame referenced for encoding/decoding of the current P frame may be referred to as a reference frame. An immediately preceding I frame or P frame and an immediately following I frame or P frame referenced for encoding/decoding of the current B frame may be referred to as reference frames.

3) Frame and Intra/Inter-Prediction Coding

Intra-prediction coding may be performed on the I frame, and inter-prediction coding may be performed on the P frame and the B frame.

When the rate of change of a P frame with respect to the previous reference frame is greater than a specific threshold, intra-prediction coding may be performed on the P frame as in the case of the I frame.

4) Criteria for Determining the I (Intra) Frame

Among the multiple frames, every k-th frame may be designated as an I frame. Alternatively, scores related to a correlation between frames may be set and a frame having a high score may be configured as an I frame.

2. Encoding/Decoding of I (Intra) Frames

In encoding/decoding a point cloud having multiple frames, the geometry of the I frame may be encoded/decoded based on an octree or a predictive tree. The attribute information about the I frame may be encoded/decoded based on the predictive/lifting transform scheme or the RAHT scheme based on the reconstructed geometry information. An I frame is a frame to which a geometry octree, a predictive tree, tree-soup, attribute coding, and the like are applied.

3. Method of Encoding/Decoding P (Predicted) Frames

In encoding/decoding a point cloud having multiple frames, according to embodiments, the P frame may be encoded/decoded based on a reference frame.

1) Coding Unit

Prediction may be performed on a P frame based on a frame unit or a prediction unit (PU). A frame may be divided into PUs for inter-prediction.

When there is little change within a frame or the degree of motion of the entire frame is constant, one global motion vector may be applied and inter-prediction may be applied on a frame-by-frame basis.

When only a part within the frame has a motion, or parts within the frame move differently from each other, inter-prediction may be applied on a PU-by-PU basis.

When there are many changes in the entire frame and the changes are out of a specific threshold range, intra-prediction, not inter-prediction, may be performed even though the frame is a P frame.

(1) Size of PU

The size of the PU may be changed according to the target content of the point cloud data, PUs of the same size may be used within one piece of content, or the sizes of the regions may be variable according to the degree of change.

In performing octree-based inter-prediction, an octree node at a specific level of the octree may be configured as a PU. For example, when the depth of the octree is d, nodes at level d−2 (wherein a specific level may be configured as a starting point in PU units. Each node may be configured on a PU-by-PU basis) may be configured on a PU-by-PU basis. Alternatively, when it is determined that child nodes belonging to parent node of a node have a similar pattern, the PU may be changed to the parent node and applied variably.

2. Geometry Inter-Prediction Coding Scheme

Inter-prediction coding may be performed on the geometry of the P frame based on a reference frame.

A global motion vector may be found in the current frame with respect to the reference frame.

When global motion (global motion that meets a specific threshold range) is present, the global motion vector of the frame may be signaled.

When the global motion is not present, the frame may be divided into PUs, a local motion vector may be searched for based on each PU. Then, the local motion vector may be signaled on a PU-by-PU basis.

For example, 1) Frame-by-frame geometry coding and 2) PU-by-PU geometry coding may be performed.

1) Frame-By-Frame Geometry Coding

A method/device according to embodiments may perform (1) octree-based geometry error correction, (2) point-based geometry error correction, and (3) quantization of geometry error correction values.

In addition, the method/device according to the embodiments may generate parameter information indicating whether inter-prediction has been performed, on a frame-by-frame basis (1=frame-by-frame, 0=PU-by-PU) and insert the same to a bitstream (see FIG. 20, etc.) to be transmitted.

When inter-prediction is performed on a frame-by-frame basis, a global motion vector, $MV(x_{mv}, y_{mv}, z_{mv})$, may be generated as parameter information and inserted to a bitstream (see FIG. 20, etc.) to be transmitted.

A partial error may occur because the global motion vector is applied. Whether error correction data is included in the geometry bitstream (1=yes, 0=no) may be generated as parameter information and inserted to the bitstream (see FIG. 20, etc.) to be transmitted.

When geometry error correction data is included, a bitstream for geometry error correction may be generated. Octree-based or point-based error correction may be performed for bitstream configuration for geometry error correction. Even when the I frame is intra-prediction coded based on the octree, octree-based geometry error correction or point-based geometry error correction may be performed for the P frame. Prediction-based geometry coding may also select both options. An error correction method (0=octree-based correction, 1=point-based correction) may be generated as parameter information and inserted to a bitstream (see FIG. 20, etc.) to be transmitted.

Figure 15:
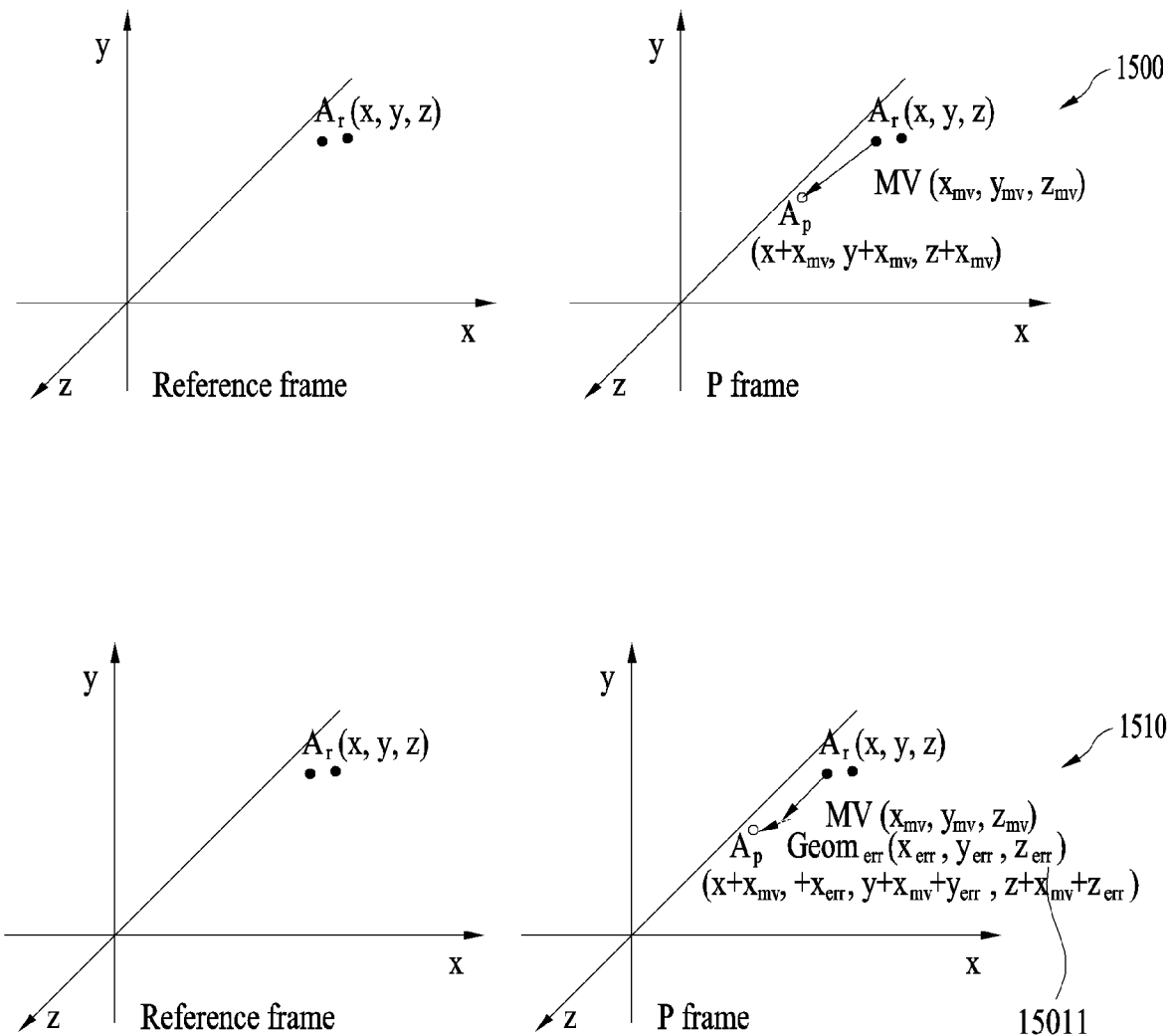
FIG. 15 illustrates geometry inter-prediction coding according to embodiments.

FIG. 15 illustrates geometry inter-prediction coding according to embodiments.

The point cloud data transmission method/device according to the embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission method of FIG. 30, and the like may perform geometry inter-prediction encoding as illustrated in FIG. 15.

The point cloud data reception method/device according to embodiments, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception method of FIG. 31, and the like may perform inter-prediction decoding.

In order to inter-predict a P frame based on a frame unit, an inter-predicted point Ap in the P frame may be generated by applying a search pattern or motion vector MV based on a point Ar in the reference frame. Further, a motion vector MV indicating a difference between points Ar and Ap may be generated.

Error correction may not be performed in generating an inter-predicted point as shown in part 15000.

As shown in part 15010, an error 15011 may be corrected in generating an inter-predicted point.

(1) Octree-Based Geometry Error Correction

When an F-th frame is designated as a reference frame, the method/device according to the embodiments may use, as a predictor, a result obtained by applying the global motion vector to the points present in the F-th frame, and signal a difference in occupancy bits from an F+1-th frame for each octree node to correct the geometry error (15011).

When the region of a specific octree node at a specific level in the F-th frame is a, and the region of an octree node at another position at the same level when a+global motion vector is applied in the F+1th frame is a', the error may be corrected by signaling the difference between the occupied bits of a' and the occupied bits of a as a geometry error correction value.

Differences in occupied bits at all levels may be signaled based on the octree. Thereby, inter-prediction may be performed while maintaining the function of geometry scalability. When there is no error in the predictive frame, the difference in occupied bits between the octree nodes is 0, and the size of the bitstream may be reduced through zero run-length coding.

(2) Point-Based Geometry Error Correction

When the F-th frame is designated as a reference frame, a result obtained by applying the global motion vector to the points present in the F-th frame may be used as a predictor, and the position residual of the points with respect to the F+1-th frame may be signaled to correct the geometry error.

Points obtained by applying the global motion vector to the F-th frame and the points in the F+1-th frame may be sorted in Moron order. The residual of the position values (x, y, z) for points obtaining the same value when the Morton code is shifted to the right by x bits in both frames (i.e., for points belonging to the same group based on position) may be signaled as a geometry error correction value to correct the error. Predictors may be matched to points in Morton order. When there is no error in the predictive frame, the position residual may be (0, 0, 0), and the size of the bitstream may be reduced through zero run-length coding. When a point is added in the F+1 th frame, the position values of the point may be encoded and signaled because there is no predictor. When a point is deleted from the F+1-th frame, the corresponding information about the deleted point may not need to be transmitted because encoding is performed based on points present in the F+1-th frame.

(3) Applying Quantization to the Geometry Error Correction Value

To support the geometry lossy coding function of inter-prediction, quantization may be applied to the geometry error correction value for signaling. The applied quantization value may be signaled.

2) PU-By-PU Geometry Coding

When the criterion of the global motion vector is not satisfied, the method/device according to the embodiments may divide the frame into PUs. A local motion vector may be searched for based on the divided PUs, and a local motion vector, $MV(x_{mv}, y_{mv}, z_{mv})$ may be signaled on a PU-by-PU basis.

Even when a local motion vector is applied, a partial error may occur. Whether geometry error correction data is included in the geometry bitstream (1=yes, 0=no) may be signaled on a PU-by-PU basis. That is, parameter information indicating whether error correction data is included may be generated and inserted to the bitstream to be transmitted.

When error correction data is included, a bitstream for geometry error correction may be signaled.

When a specific PU region at a specific level in the F-th frame is a, a PU region obtained in the F+1-th frame by applying a+local motion vector may be referred to as a'. The residual of the position values (x, y, z) for points in the two regions (i.e., points belonging to the same group based on position) may be signaled as an error correction value to correct the error. When there is no error in the predictive frame, the position residual may be (0, 0, 0), and the size of the bitstream may be reduced through zero run-length coding.

When a point is added in the F+1 th frame, the position values of the point may be encoded and signaled because there is no predictor. When a point is deleted from the F+1-th frame, the corresponding information about the deleted point may not need to be transmitted because encoding is performed based on points present in the F+1-th frame.

(1) Applying Quantization to the Geometry Error Correction Value

To support the geometry lossy coding function of inter-prediction, quantization may be applied to the geometry error correction value for signaling. The applied quantization value may be signaled.

3. Attribute Inter-Prediction Coding Scheme

A method/device according to embodiments may perform inter-prediction coding on an attribute of a P frame based on a reference frame.

For example, when the current frame is the F+1-th frame, inter-prediction may be performed based on an error, motion vector (MV), and the like with reference to the previously processed F-th frame. Therefore, the operation of searching for the nearest neighbor separately from the attribute coding process may be skipped. In addition, the attribute (color) of the geometry may be used as it is.

1) Recoloring

When the method/device according to the embodiments performs lossy geometry coding or error correction, recoloring may be required in the attribute coding operation.

When geometry error correction is not performed, lossy geometry coding may be performed, and recoloring may need to be performed based on the reconstructed geometry position value.

When quantization is applied to the geometry error correction value, lossy geometry coding may be performed, and recoloring may need to be performed based on the reconstructed geometry position value.

Recoloring may be additionally performed to perform the inter-prediction according to the embodiments.

2) Attribute Coding

The method/device according to the embodiments may determine whether to perform coding on a frame-by-frame basis or a PU-by-PU basis in performing geometry inter-prediction coding, and may also determine a corresponding point in a reference frame according to settings. In addition, whether to perform geometry error correction may be determined. Attribute inter-prediction coding may be performed according to a predetermined configuration during geometry coding. For example, the PU unit of geometry coding may be employed as the attribute PU unit.

Whether attribute error correction data is included in the attribute bitstream (1=yes, 0=no) may be signaled as parameter information.

In order to perform inter-prediction on points included in a current P frame, the method/device according to the embodiments may add a point similar to the current frame and predict, in the P frame, a predicted point Ap having the smallest difference from a point Ar in the previously processed reference frame. A motion vector MV representing the difference between the reference point Ar and the inter-predicted point Ap may be generated.

The motion vector according to the embodiments may include a global (global) motion vector and a local motion vector. A motion vector according to the entire frame or a specific unit (PU) may be applied and transmitted.

The motion vector is a vector that may represent an average difference of points in a corresponding region (frame). One motion vector may be generated per frame or PU.

For example, a global motion vector is a frame-based common motion vector, and a local motion vector is a motion vector of points belonging to a unit region obtained by dividing the frame into specific units (PUs).

A motion vector is a vector that may represent a common motion in a reference frame and a current frame.

When the method/device according to the embodiments corrects an error of a predicted point, it may encode and transmit the residual Ap-Ar.

When error correction is skipped, the residual is not transmitted. When error correction is performed, a residual is transmitted for each point. Also, as described above, one motion vector may be inserted to a bitstream for the entire frame or for each specific unit and transmitted. Accordingly, the reception method/device may reconstruct point cloud data based on the motion vector according to the entire frame or based on the motion vector according to a specific unit (PU). In the case where error correction is performed on the transmitting side, the reception method/device may more accurately reconstruct the point cloud data based on the residual included in the received bitstream.

The reception method/device according to the embodiments may reconstruct the inter-predicted point Ap based on the reference frame and the motion vector. In this regard, in order to generate an accurate inter-predicted point Ap, error correction may or may not be performed.

For error correction, octree-based geometry error correction and point-based geometry error correction may be performed. In the octree-based error correction, a bit difference may be transmitted for each node.

Using octree-based correction for an intra frame (I frame) does not necessarily mean that octree-based correction should be performed for a predictive frame (p frame). That is, octree-based geometry error correction may be performed or point-based error correction may be applied.

The error correction means that, after applying a motion vector to points in a frame, a residual with respect to points in the current frame is transmitted as an error correction value. The residual represents an error correction value.

A method/device according to embodiments uses reference points x, y, z from a previously processed reference frame to inter-predict the current p-frame. In order to generate a predicted point for a current point in the current frame, a predicted point may be generated based on a motion vector representing a motion difference with respect to the reference point.

According to prediction coding, only the residual between the predicted value and the current value may be encoded and transmitted, thereby reducing the size of the bitstream. Whether to perform correction may be determined by signaling, and a residual may be transmitted as an error correction value depending on the determination. Accordingly, an accurate residual may be generated from values for octree-base or point-based error correction.

The motion vector is a representative movement vector. Accordingly, it may not fit all points. In order to address this issue, a motion vector is obtained or applied as a global motion vector/local motion vector. The motion vector may not be perfectly matched to all points even within a specific region to which a local motion vector is applied. Accordingly, an error may occur. In order to address this issue, a point-based or octree node-based error correction value may be transmitted to eliminate or reduce loss.

Figure 16:
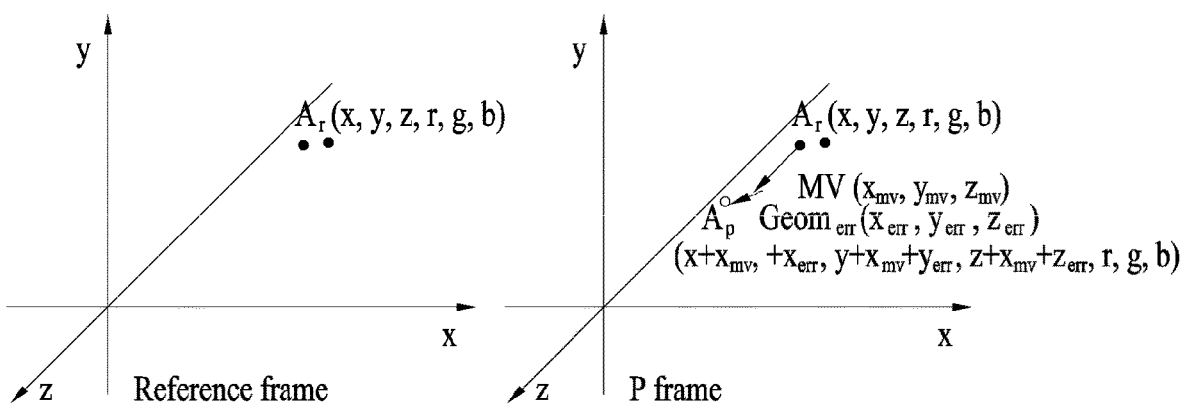
FIGS. 16 and 17 illustrate attribute coding according to embodiments.
Figure 17:
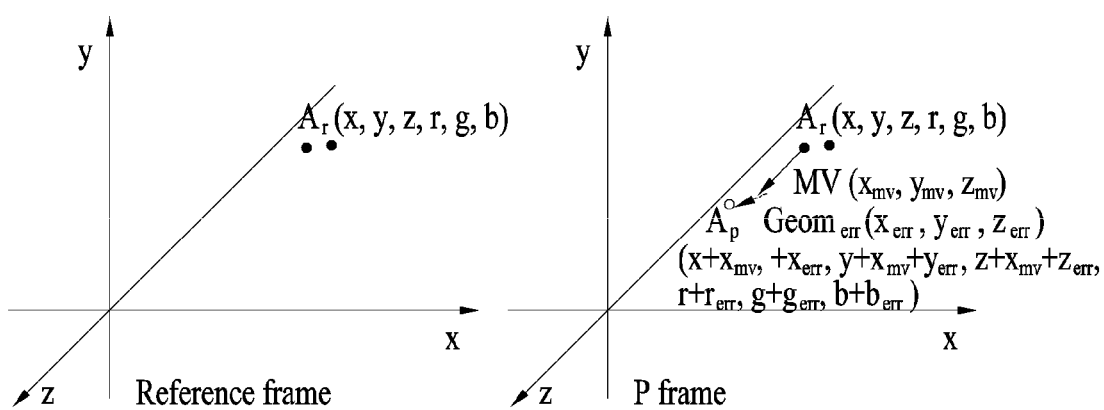

FIGS. 16 and 17 illustrate attribute coding according to embodiments.

The point cloud data transmission method/device according to the embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission method of FIG. 30, and the like, and the corresponding attribute encoder may encode attribute data as illustrated in FIGS. 16 and 17.

The point cloud data reception method/device according to embodiments, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception method of FIG. 31, and the like, and the corresponding attribute decoder may decode the attribute data as illustrated in FIGS. 16 and 17.

(1) Attribute Coding when Attribute Error Correction is Skipped

When attribute error correction is skipped, the encoder may not signal attribute error correction data as parameter information in a bitstream. That is, the attribute data bitstream may not be signaled.

When there is no attribute data bitstream, the attribute of a matched point in the reference frame may be configured as an attribute of a reconstructed point in geometry reconstruction. That is, the attribute data about a point corresponding to the reference frame may be used as current attribute data (color), and a nearest neighbor may not be searched for the attribute encoding of the current point.

FIG. 16 illustrates a process in which error correction is performed in geometry coding and attributes are reconstructed when attribute error correction is not performed.

Based on a point Ar (x, y, z (geometry), r, g, b (attribute)) in a reference frame corresponding to the current frame p, a motion vector for Ar-Ap may be generated, and the coordinates (position) of Ap may be generated based on the geometry error data. The attributes r, g, and b of Ar may be used as the attributes of Ap.

(2) Attribute Coding when Attribute Error Correction is Performed

When attribute error correction is performed, a bitstream for attribute error correction may be generated (signaled).

When the F-th frame is designated as a reference frame, the position of a geometry point in the F+1-th frame (current frame) may be encoded according to a geometry encoding option, and the residual of the attribute value of a point matched to the F+1-th frame in the F-th frame may be signaled as an attribute correction value, (r_err, g)err, b_err) to correct the attribute error.

To encode a point in the p frame, a motion vector may be generated based on the point Ar in the corresponding reference frame. Just as the error is corrected based on the geometry residual between frame F and frame F+1 for the geometry of Ap, the attribute error may be corrected based on the attribute residual. Thus, for x, y, and z of Ap, x+x_mv+x_err, y+y_mv+y_err, and z+z_mv+z_err, which are motion vector and geometry error-corrected values, may be obtained. For r, g, and b of Ap, r+r_err, g+g_err, and b+b_err, which are attribute error-corrected values, may be obtained.

(3) Applying Quantization to Attribute Error Correction Values

To support the attribute loss coding function of inter-prediction, quantization may be applied to attribute error correction values. The applied quantization value may be signaled as parameter information.

Geometry prediction data and attribute prediction data according to embodiments may be included in a bitstream and transmitted for each geometry data unit and attribute data unit.

FIG. 18 illustrates a point cloud data transmission device according to embodiments.

The point cloud data transmission method/device according to the embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission method of FIG. 30, and the like, and the corresponding attribute encoder may correspond to the transmission device (encoder) of FIG. 18. Each component of FIG. 18 and corresponding drawings may correspond to software, hardware, a processor connected to a memory, and/or a combination thereof.

FIG. 18 is a block diagram of a PCC data transmitter (encoder). The encoder is referred to as an encoding device, and the decoder is referred to as a decoding device. PCC data may be input to the encoder and encoded to output a geometry information bitstream and an attribute information bitstream.

The data input unit may receive data to encode the point cloud data. The data may include geometry data (which may be referred to as geometry, geometry information, or the like), attribute data (which may be referred to as attributes, attribute information, or the like), and parameter information representing coding-related settings.

The coordinate transformer may transform the coordinates related to a point in order to encode the point. A coordinate system suitable for coding may be selected.

The geometry information transform/quantization processor may quantize the geometry data. The quantized value may follow a set value or may be included in a bitstream as parameter information and transmitted.

The spatial partitioner may partition the space of the point cloud data according to the coding unit. The point cloud data may be encoded in partitioned spatial units. Attribute data about spatially partitioned points may be provided to attribute coding as source data.

The geometry information encoder may perform geometry encoding.

The voxelization processor may voxelize the geometry data in the space.

The geometry information intra-predictor may receive an I frame from among multiple frames containing point cloud data and encode the point cloud data based on an intra-prediction technique. The octree/predictive tree generator may present the points in the I frame in an octree structure or a predictive tree to generate predicted data for the current point, and may generate a residual between the predicted data and the current data to reduce the bitstream size, thereby compressing the point cloud data accurately and efficiently. Geometry information, which is a residual generated by the geometry information entropy encoder, may be encoded based on an entropy scheme.

Depending on whether the frame is an I frame or a P frame, intra prediction or inter-prediction may be used as a method of compressing the geometry data of the point cloud data.

Also, even in the case where the frame is a P frame, the rate of change of a point value between frames may be checked, and intra-prediction coding may be applied when the rate of change is greater than a specific threshold. This is because intra-prediction may be more accurate and efficient than inter-prediction when the rate of change is high.

That is, the transmission method/device according to the embodiments may check the type of frame and perform intra-prediction on the I frame through a geometry information intra-predictor. The type of frame may be checked, and the change rate of the P frame with respect to the reference frame may be checked. When the change rate is greater than a change threshold, intra-prediction may be performed through a geometry information intra-predictor. When the rate is low, inter-prediction may be performed through the geometry information inter-predictor (see section 4.3.2 for details of the operation of geometry inter-prediction).

For the P frame, when the rate of change of geometry data about a point between frames is not greater than the threshold, the geometry information inter-predictor performs prediction coding through a motion vector based on a corresponding point in the reference frame.

Geometry information reconstructed based on the encoded geometry information may be stored in a reference frame buffer. The geometry and attribute information about the frame stored in the reference frame buffer may be referenced and used for encoding by the geometry information inter-predictor and the attribute information inter-predictor.

The geometry information encoder may generate a bitstream containing geometry information. It may also reconstruct the geometry information, and transmit the reconstructed geometry information to the attribute information encoder. This is because the attribute data is dependent on the geometry data (position), and thus the reconstructed geometry information is required to compress the attribute data.

The color transform processor may transform an attribute (color). It may transform the attribute to an appropriate color system for attribute compression.

The attribute information encoder may configure an attribute compression method according to whether or not geometry lossy coding is performed.

For example, when geometry lossy coding is performed, recoloring may be performed to reconfigure the attribute (color) due to lost points. That is, it is checked whether the geometry is encoded with loss, and when the encoding is lossy, an attribute value suitable for the position of the lost point may be found in the source point cloud data and configured through the recolorer.

When geometry lossy coding has not been performed, it is checked whether geometry inter-prediction has been performed.

When geometry inter-prediction has not been performed, attribute coding, attribute intra-prediction coding is performed as attribute coding, similarly to geometry coding. Specifically, in order to compress attributes of points in a frame, the LOD configurator presents point cloud data in an LOD structure, and the neighbor point set configurator configures a neighbor point set having attribute data similar to that of the current point based on the LOD structure. The attribute information predictor may search for a neighbor having the most similar attribute data in the neighbor point set and generate a residual (attribute) between the current attribute and the neighbor, and the residual information quantization processor may quantize the residual. The attribute information may be encoded based on the entropy scheme, and a bitstream containing the attribute information may be generated.

It may be checked whether inter-prediction is applied to the geometry. In the case where inter-prediction is applied, inter-prediction may be performed through the attribute information inter-predictor (see section 4.3.3 for details of the operation of attribute inter-prediction).

In the case where intra-prediction is applied to the geometry, intra-prediction may be performed through the attribute information intra-predictor.

Attribute information reconstructed based on the encoded attribute information may be stored in the reference frame buffer. The geometry and attribute information about the frame stored in the reference frame buffer may be referenced and used for encoding by the geometry information inter-predictor and the attribute information inter-predictor.

The attribute information inter-predictor may efficiently compress attribute data by predicting attribute data between frames based on operations according to embodiments, such as geometry inter-prediction.

FIG. 19 illustrates a point cloud data reception device according to embodiments.

The point cloud data reception method/device according to embodiments, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception method of FIG. 31, and the like, and the corresponding attribute decoder may correspond to the reception device (decoder) of FIG. 19. Each component of FIG. 18 and corresponding drawings may correspond to software, hardware, a processor connected to a memory, and/or a combination thereof.

FIG. 19 is a block diagram of a PCC data decoder. An encoded geometry information bitstream and attribute information bitstream may be input to the decoder and decoded to output reconstructed PCC data.

The geometry information decoder may receive the geometry information bitstream. Geometry data (information) contained in the bitstream may be decoded based on parameter information contained in the bitstream.

The geometry information entropy decoder may decode the geometry data of the point cloud data based on the entropy scheme.

The geometry information decoder may decode the geometry data based on whether geometry intra coding is performed.

When geometry intra coding is performed, the geometry information intra-prediction reconstructor may decode the geometry data based on the intra-prediction method in order.

For example, the octree reconstructor may reconstruct geometry information in a frame as an octree or a predictive tree.

The geometry information predictor may generate a predicted value similar to the value of the current point based on the octree or predictive tree.

The geometry information transform/inverse quantization processor may transform and inversely quantize the geometry information. The inverse quantization may be applied based on a quantization parameter applied during encoding.

The coordinate inverse transformer may inversely transform the coordinates related to the geometry data.

It is checked whether the geometry has been intra-predicted by the encoder. When intra-prediction has been applied, the geometry information may be decoded through the intra-prediction reconstructor.

When the geometry bitstream has not been intra-predicted, the geometry information inter-prediction reconstructor may decode the bitstream based on operations according to embodiments.

The reconstructed geometry information may be stored in the reference frame buffer. The geometry and attribute information about the frame stored in the reference frame buffer may be referenced and used for decoding by the geometry information inter-prediction reconstructor and the attribute information inter-prediction reconstructor.

The geometry information decoder may reconstruct the geometry information and transmit the same to the attribute information decoder. The reconstructed geometry information is used in decoding attribute information.

The attribute information decoder may receive a bitstream containing attribute information. It may receive parameters contained in the bitstream, reconstructed geometry information, and attribute data contained in the bitstream.

It may be checked whether the attribute has been intra-predicted by the encoder. When intra-prediction has been applied, the attribute may be decoded through the attribute information intra-prediction reconstructor.

When attribute intra-prediction is performed, the attribute information intra-prediction reconstructor may decode attribute data in a frame based on the intra-prediction technique.

For example, the LOD configurator may present point cloud data in an LOD structure. The neighbor point set configurator may configure a neighbor point set having attributes similar to those of the current point in order to reconstruct the attribute of the current point. The attribute information predictor may generate predicted data based on the neighbor point set. The residual information inverse quantization processor may reconstruct attribute data by summing the residuals and inversely quantize the same.

Color (attribute) values in the reconstructed attribute information may be inversely transformed by the color inverse transform processor.

When the attribute bitstream has not been intra-predicted, it may be decoded by the attribute information inter-prediction reconstructor.

The reconstructed attribute information may be stored in the reference frame buffer. The geometry and attribute information about the frame stored in the reference frame buffer may be referenced and used for decoding by the geometry information inter-prediction reconstructor and the attribute information inter-prediction reconstructor.

When attribute intra coding is not performed, the attribute information inter-prediction reconstructor may decode the attribute data based on the inter-prediction technique.

FIG. 20 illustrates a structure of a bitstream containing point cloud data according to embodiments.

The point cloud data transmission method/device according to the embodiments, which corresponds to the transmission device 10000 of FIG. 1, the point cloud video encoder 10002 of FIG. 1, the transmitter 10003 of FIG. 1, the acquisition 20000/encoding 20001/transmission 20002 of FIG. 2, the encoder of FIG. 4, the transmission device of FIG. 12, the device of FIG. 14, the encoder of FIG. 18, the transmission method of FIG. 30, and the like, and the corresponding geometry/attribute encoder may generate a bitstream containing encoded point cloud data and parameters related thereto as shown in FIG. 20.

The point cloud data reception method/device according to embodiments, which corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception method of FIG. 31, and the like, and the corresponding geometry/attribute decoder may receive a bitstream containing the encoded point cloud data and related parameters as shown in FIG. 20, and decode the point cloud data (geometry data+attribute data) based on the parameters.

In order to add/carry out embodiments, related information may be inserted to a bitstream and signaled. Signaling information according to the embodiments may be used at the transmitting side or the receiving side.

The encoded point cloud is configured as follows. The point cloud data encoder configured to perform geometry encoding and/or attribute encoding may generate the following encoded point cloud (or a bitstream containing the point cloud). In addition, signaling information related to point cloud data may be generated and processed by a metadata processor of the point cloud data transmission device and inserted to the point cloud as follows.

According to embodiments, the term slice in FIG. 20 may be referred to as a data unit.

Each abbreviation has the following meaning. Each abbreviation may be referred to by another term within the scope of the equivalent meaning. SPS: Sequence Parameter Set; GPS: Geometry Parameter Set; APS: Attribute Parameter Set; TPS: Tile Parameter Set; Geom: Geometry bitstream=geometry slice header+[geometry PU header+ Geometry PU data]|geometry slice data); Attr: attributes (Attribute bitstream=attribute data unit header+[attribute PU header+attribute PU data]|attribute data unit data).

Option information related to inter-prediction according to embodiments may be added to the GPS or the TPS and signaled.

The option information related to inter-prediction according to the embodiments may be added to the TPS or the geometry header or attribute header for each slice and signaled.

Tiles or slices are provided such that point cloud data may be divided into regions and processed.

When the point cloud data is divided into regions, an option for generating different sets of neighbor points for the respective regions may be configured to provide a selection method exhibiting low complexity and low reliability of results or a selection method exhibiting high complexity and high reliability. The option may be configured differently according to the capacity of the receiver.

Accordingly, when a point cloud is divided into tiles, different options may be applied to the respective tiles.

When the point cloud is divided into slices, different options may be applied to the respective slices. A geometry PU may be added, and a geometry PU header and geometry PU data may be added. An attribute PU may be added, and an attribute PU header and attribute PU data may be added.

Using the parameters as shown in FIGS. 21 to 29, the transmission device according to the embodiments may transmit the point cloud data encoding method to the receiving side through an appropriate structure of the bitstream. The reception device according to the embodiments may reconstruct the point cloud data accurately and efficiently based on the parameters.

FIG. 21 shows a geometry parameter set according to embodiments.

FIG. 21 shows the geometry parameter set (GPS) included in the bitstream of FIG. 20.

gps_frame_type: Specifies the frame type, which may be indicated as, for example, 0=I frame, 1=P frame, and 2=B frame.

gps_frame_encoding_type: Specifies the frame encoding type, which may be indicated as, for example, 0=intra-prediction coding and 1=inter-prediction coding.

inter_PU_size_type: Specifies the PU size type applied to the frame, which may be indicated as, for example, 0=frame, 1=fixed PU size type, and 2=variable PU size type.

inter_global_motion_vector: Specifies the global motion vector when the PU size applied to the frame is frame.

inter_geom_error_residuals_exist_flag: Specifies whether geometry error correction data to be applied to the frame is included, which may be indicated as, for example, 0=no and 1=yes.

inter_geom_error_residuals_coding_type: Specifies a geometry error correction data coding method to be applied to the frame, which may be indicated as, for example, 0=octree-based and 1=point-based.

gps_geom_parameter_set_id: Provides an identifier for the GPS for reference by other syntax elements. The value of gps_seq_parameter_set_id may be in the range of 0 to 15, inclusive.

gps_seq_parameter_set_id:

A sequence parameter set identifier for the active SPS. The value may be in the range of 0 to 15, inclusive.

When gps_frame_encoding_type is 1 (inter-prediction coding), parameters related to the inter-prediction according to the embodiments may be provided.

When inter_PU_size_type is 0 (frame), each global motion vector for the coordinate system may be provided.

FIG. 22 shows an attribute parameter set according to embodiments.

FIG. 22 shows an attribute parameter set (APS) inserted to the bitstream of FIG. 20.

aps_frame_type: Specifies the frame type, which may be indicated as, for example, 0=I frame, 1=P frame, and 2=B frame.

aps_frame_encoding_type: Specifies frame encoding type, which may be indicated as, 0=intra-prediction coding and 1=inter-prediction coding.

inter_PU_size_type: Specifies the PU size type applied to the frame, which may be indicated as, for example, 0=frame, 1=fixed PU size type, and 2=variable PU size type.

inter_global_motion_vector: Specifies the global motion vector when the PU size applied to the frame is frame.

inter_attr_error_residuals_exist_flag: Specifies whether attribute error correction data to be applied to the frame is included, which may be indicated as, for example, 0=no and 1=yes.

different_nn_range_per_lod_flag: A flag specifying whether to use different maximum/minimum ranges of neighbor points for each LOD aps_attr_parameter_set_id: An identifier for APS for reference by other syntax elements. The value thereof may be in the range of 0 to 15, inclusive.

aps_seq_parameter_set_i: Specifies the value of sps_seq_parameter_set_id for the active SPS. The value thereof may be in the range of 0 to 15, inclusive.

lifting_num_pred_nearest_neighbours:

Specifies the maximum number of nearest neighbors used for prediction. The value thereof may be in the range of 1 to XX.

lifting_max_num_direct_predictors:

Specifies the maximum number of predictors to be used for direct prediction. The value thereof may be in the range of 0 to lifting_num_pred_nearest_neighbours. The value of the variable MaxNumPredictors that is used in the decoding process may be as follows: MaxNumPredictors=lifting_max_num_direct_predicots+1.

Corresponding description of FIG. 21 may be applied redundantly to FIGS. 22 to 29 and the like.

FIG. 23 shows a tile parameter set according to embodiments.

FIG. 23 shows the tile parameter set included in the bitstream of FIG. 20.

tile_frame_encoding_type: Specifies the encoding type applied to the tile, which may be indicated as, for example, 0=intra-prediction coding and 1=inter-prediction coding.

inter_PU_size_type: Specifies the PU size type applied to the tile, which may be indicated as, for example, 0=frame, 1=fixed PU size type, and 2=variable PU size type.

inter_global_motion_vector: Specifies the global motion vector when the PU size applied to the tile is frame.

inter_geom_error_residuals_exist_flag: Specifies whether geometry error correction data to be applied to the tile is included, which may be indicated as, for example, 0=no and 1=yes.

inter_geom_error_residuals_coding_type: Specifies a geometry error correction data coding method to be applied to the tile, which may be indicated as, for example, 0=octree-based and 1=point-based.

inter_attr_error_residuals_exist_flag: Specifies whether attribute error correction data to be applied to the tile is included, which may be indicated as, for example, 0=no and 1=yes.

num_tiles: Specifies the number of tiles signaled for the bitstream. When not present, num_tiles may be inferred to be zero.

tile_bounding_box_offset_x[i]: Indicates the x offset of the i-th tile in the Cartesian coordinates. When not present, the value thereof may be inferred to be sps_bounding_box_offset_x.

tile_bounding_box_offset_y[i]: Indicates the y offset of the i-th tile in the Cartesian coordinates. When not present, the value thereof may be inferred to be sps_bounding_box_offset_y.

tile_bounding_box_offset_z[i]: Indicates the z offset of the i-th tile in the Cartesian coordinates. When not present, the value thereof may be inferred to be sps_bounding_box_offset_z.

FIG. 24 shows a geometry slice header according to embodiments.

FIG. 24 shows the geometry header included in the bitstream of FIG. 20. According to embodiments, the header may be referred to as a geometry data unit header.

gsh_frame_encoding_type: Specifies the encoding type applied to the slice, e.g., 0=intra-prediction coding and 1=inter-prediction coding.

inter_PU_size_type: Specifies the PU size type applied to the slice, e.g., 0=frame, 1=fixed PU size type, and 2=variable PU size type.

inter_global_motion_vector: Specifies the global motion vector when the PU size applied to the slice is frame.

inter_geom_error_residuals_exist_flag: Specifies whether geometry error correction data to be applied to the slice is included, e.g., 0=no and 1=yes.

inter_geom_error_residuals_coding_type: Specifies the geometry error correction data coding method to be applied to the slice, e.g., 0=octree-based and 1=point-based.

gsh_geometry_parameter_set_id: Specifies the geometry parameter set ID of the active GPS.

gsh_tile_id: Specifies the value of the tile id that is referred to by the GSH. The value may be in the range of 0 to XX, inclusive.

gsh_slice_id: Identifies the slice header for reference by other syntax elements. It may be in the range of 0 to XX, inclusive. A slice may be referred to as a data unit.

FIG. 25 shows an attribute slice header according to embodiments.

FIG. 25 shows the attribute slice header included in the bitstream of FIG. 20.

ash_frame_encoding_type: Specifies the encoding type applied to the slice, e.g., 0=intra-prediction coding and 1=inter-prediction coding.

inter_PU_size_type: Specifies the PU size type applied to the slice, e.g., 0=frame, 1=fixed PU size type, and 2=variable PU size type.

inter_global_motion_vector: Specifies the global motion vector when the PU size applied to the slice is frame.

inter_attr_error_residuals_exist_flag: Specifies whether attribute error correction data to be applied to the slice is included, e.g., 0=no and 1=yes.

gsh_geometry_parameter_set_id: Specifies the value of the geometry parameter set ID of the active GPS.

gsh_tile_id: Specifies the value of the tile id that is referred to by the GSH. The value may be in the range of 0 to XX, inclusive.

gsh_slice_id: Identifies the slice header for reference by other syntax elements. It may be in the range of 0 to XX, inclusive. A slice may be referred to as a data unit.

FIG. 26 shows a geometry PU header according to embodiments.

FIG. 26 shows the geometry PU header included in the bitstream of FIG. 20.

pu_tile_id: Specifies the tile ID to which the PU belongs.

pu_slice_id: Specifies the slice ID to which the PU belongs.

pu_cnt: Specifies the number of PUs included in the slice.

pu_id: Specifies the PU ID.

pu_bounding_box_offset_xyz: Specifies the offset of the PU region along X, Y, and Z.

pu_bounding_box_size_xyz: Specifies the size of the PU region along X, Y, and Z pu_octree_level: Specifies the octree level of a PU in generating the PU based on the octree.

pu_octree_mc: Specifies the Morton code value at the octree level of the PU in generating the PU based on the octree.

pu_local_motion_vector: Specifies a local motion vector to be applied to the PU.

pu_geometry_error_residuals_exist_flag: Specifies whether geometry error correction is included in the PU.

pu_origin_xyz: Specifies the position values of the origin of all PUs.

pu_origin_log 2_scale: Specifies the origin scale value of all PUs.

pu_id and pu_bounding_box_offset_xyz for each PU count may be provided in the header. In addition, when inter_error_residuals_coding_type is 0, pu_octree_level and pu_octree_mc may be included in the header.

pu_local_motion_vector corresponding to pu_id for each axis of the coordinate system may be provided in the header.

A PU origin corresponding to pu_id for each axis of the coordinate system may be provided in the header.

FIG. 27 shows an attribute PU header according to embodiments.

pu_tile_id: Specifies the tile ID to which the PU belongs.

pu_slice_id: Specifies the slice ID to which the PU belongs.

pu_cnt: Specifies the number of PUs included in the slice.

pu_id: Specifies the PU ID.

pu_bounding_box_offset_xyz: Specifies the PU region offset.

pu_bounding_box_size_xyz: Specifies the size of the PU region.

pu_octree_level: Specifies the octree level of a PU in generating the PU based on the octree.

pu_octree_mc: Specifies the Morton code value at the octree level of the PU in generating the PU based on the octree.

pu_local_motion_vector: Specifies a local motion vector to be applied to the PU.

pu_attr_error_residuals_exist_flag: Specifies whether attribute error correction is included in the PU.

pu_origin_xyz: Specifies the position values of the origin of all PUs.

pu_origin_log 2_scale: Specifies the origin scale value of all PUs

The description of the fields in FIG. 27 may also be applied to FIGS. 28 to 29.

FIG. 28 shows geometry PU data according to embodiments.

FIG. 28 shows the geometry PU data included in the bitstream of FIG. 20.

pu_id: Specifies the PU ID.

pu_num_pts: Specifies the number of points belonging to the PU.

residual_occupancy_bits: Specifies a geometry error correction value of occupancy bits of an octree-based octree node in the PU.

residual_positions: Specifies a geometry error correction value of the position-based position difference in the PU.

The following information may be inserted to the bitstream as geometry node information and transmitted.

geom_node_qp_offset_eq0_flag equal to 1 specifies that the current node's quantization parameter is an offset from the slice quantization parameter. geom_node_qp_offset_eq0_flag equal to 0 specifies that the current node quantization parameter inherits the quantization parameter of the parent node.

geom_node_qp_offset_sign_flag: Indicates the sign of nodeQpOffset. When geom_node_qp_offset_sign_flag is equal to 0, the corresponding nodeQpOffset has a negative value. When geom_node_qp_offset_sign_flag is equal to 1, the corresponding nodeQpOffset has a positive value.

geom_node_qp_offset_abs_minus1 plus 1 specifies, when present, the absolute difference between the current node's quantization parameter, nodeQp, and the slice quantization parameter.

FIG. 29 shows attribute PU data according to embodiments.

FIG. 29 shows the attribute PU data included in the bitstream of FIG. 20.

pu_id: Specifies the PU ID.

pu_num_pts: Specifies the number of points belonging to the PU.

residual_attributes: Specifies the attribute error correction value of the attribute difference in the PU.

FIG. 30 illustrates a method of transmitting point cloud data according to embodiments.

S3000: The point cloud data transmission method according to the embodiments may include encoding point cloud data.

The encoding operation according to the embodiments may include the operations of the transmission device 10000, the point cloud video encoder 10002 in FIG. 1, the encoding 20001 in FIG. 2, the encoder in FIG. 4, the transmission device in FIG. 12, the XR device 1430 in FIG. 14, the point cloud data encoding in FIGS. 15 to 17, the transmission device in FIG. 18, the generation of a bitstream containing point cloud data in FIG. 20, and the generation of parameter information in FIGS. 21 to 29.

S3010: The point cloud data transmission method according to the embodiments may further include transmitting a bitstream containing the point cloud data.

The transmission operation according to the embodiments may include the operations of the transmission device 10000, the transmitter 10003 in FIG. 1, the transmission 20002 in FIG. 2, the transmission of a geometry bitstream and attribute bitstream in FIG. 4, the encoding and transmission of point cloud data in FIG. 12, the transmission by the XR device 1430 in FIG. 14, the transmission of a geometry information bitstream and attribute information bitstream in FIG. 18, and the bitstream transmission in FIGS. 20 to 29.

FIG. 31 illustrates a method of receiving point cloud data according to embodiments.

S3100: The point cloud data reception method according to the embodiments may include receiving a bitstream containing point cloud data.

The reception operation according to the embodiments may include the operations of the reception device 10004, the receiver 10005 in FIG. 1, reception according to the transmission 20002 in FIG. 2, the reception of a bitstream containing a geometry bitstream and attribute bitstream in FIGS. 10 and 11, the reception in FIG. 13, the reception of point cloud data by the XR device in FIG. 14, the reception of a geometry information bitstream and attribute information bitstream in FIG. 19, and the bitstream reception in FIGS. 20 to 29.

S3101: The point cloud data reception method according to the embodiments may further include decoding the point cloud data.

The decoding operation according to the embodiments may include the operations of the reception device 10004, the point cloud video decoder 10006 in FIG. 1, the decoding 20003 in FIG. 2, the geometry decoder and attribute decoder in FIGS. 10 and 11, the reception device in FIG. 13, the decoding of the XR device 1430 in FIG. 14, the decoding according to FIGS. 15 to 17, the reception device in f FIG. 19, and the bitstream decoding in FIGS. 20 to 29.

A point cloud data transmission method according to embodiments may include encoding point cloud data, and transmitting a bitstream containing the point cloud data.

The encoding of the point cloud data according to the embodiments may include inter-predicting geometry data of the point cloud data and inter-predicting attribute data of the point cloud data.

The inter-predicting of the geometry data according to the embodiments, based on frames including point cloud data, with reference to points included in a first frame (reference frame), in a second frame (current P frame) Further comprising generating a predicted point for the included point based on the motion vector, or inter-predicting the geometry data, based on frames including the point cloud data, a first predicted point for the first frame is generated. The method may further include generating a predicted point for a point included in the second prediction unit for the second frame based on the motion vector by referring to the point included in the prediction unit.

The step of inter-predicting the attribute data may further include setting attribute data of the reconstructed point of the geometry data as an attribute of the predicted point of the attribute data.

The inter-prediction of the geometry data may include generating an error correction value based on a difference in occupied bits between a first octree node of a first frame and a second octree node of a second frame, and a predicted point based on the error correction value Further comprising the step of generating, or generating an error correction value based on the residual of the position value between the point for the first frame and the point for the second frame, and generating a predicted point based on the error correction value. Further comprising, or generating an error correction value based on the residual of the position value between the points included in the first prediction unit for the first frame and the second prediction unit for the second frame, and the error correction value Based on the method, a step of generating a predicted point may be further included.

The inter-prediction of the attribute data may include generating an error correction value based on a residual of an attribute between a point included in the first frame and a point included in the second frame, and generating attribute data of the predicted point based on the error correction value. A generating step may be further included.

An apparatus for receiving point cloud data according to embodiments includes a receiver configured to receive a bitstream including point cloud data; and a decoder to decode the point cloud data; may include A decoder for decoding point cloud data according to embodiments may include a geometry decoder for inter-predicting geometry data of the point cloud data and an attribute decoder for inter-predicting attribute data of the point cloud data.

The geometry decoder refers to the points included in the first frame based on the frames including the point cloud data and generates predicted points for the points included in the second frame based on the motion vector, or the point cloud Based on frames including data, by referring to points included in the first prediction unit for the first frame, predicted points for points included in the second prediction unit for the second frame are converted to motion vectors. may be created based on The attribute decoder may set attribute data of a reconstructed point of geometry data as an attribute of a predicted point of attribute data.

The geometry decoder generates an error correction value based on the difference in occupied bits between the first octree node of the first frame and the second octree node of the second frame, generates a predicted point based on the error correction value, or An error correction value is generated based on the residual of the position value between the point for the first frame and the point for the second frame, and a predicted point is generated based on the error correction value, or the first prediction for the first frame An error correction value may be generated based on the residual of position values between the units and points included in the second prediction unit for the second frame, and prediction points may be generated based on the error correction value.

Due to this, since the size of the bitstream may be reduced, there is an effect of efficiently supporting real-time point cloud data capture/compression/transmission/reconstruction/playback services.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

[Mode for Disclosure]

As described above, related contents have been described in the best mode for carrying out the embodiments.

INDUSTRIAL APPLICABILITY

As described above, the embodiments may be fully or partially applied to the point cloud data transmission/reception device and system.

It will be apparent to those skilled in the art that various changes or modifications can be made to the embodiments within the scope of the embodiments.

Thus, it is intended that the embodiments cover the modifications and variations of this disclosure provided they come within the scope of the appended claims and their equivalents.

The invention claimed is:

1. A method of encoding point cloud data, the method comprising:
    encoding geometry data of point cloud data based on an inter-prediction,
    wherein the geometry data is encoded based on a reference frame for the inter-prediction,
    wherein the reference frame is generated based on global motion information,
    wherein a value related to the geometry data is applied to a point in the reference frame;
    encoding attribute data of the point cloud data; and
    transmitting a bitstream containing the point cloud data,
    wherein the bitstream includes parameter information related to a value for the inter-prediction,
    wherein the encoding the geometry data includes:
    generating an error correction value based on a difference in occupied bits between a first octree node of a current frame and a second octree node of the reference frame, and generating the predicted point based on the error correction value.

2. The method of claim 1, wherein the encoding of the point cloud data comprises:
    inter-predicting attribute data of the point cloud data.

3. The method of claim 1,
    wherein the encoding the geometry data includes:
    based on frames including the point cloud data, generating, with reference to a point included in a first the current frame, a predicted point for a point included in the reference frame based on a motion vector; or
    based on the frames including the point cloud data, generating, with reference to a point included in a first prediction unit for the current frame, a predicted point for a point included in a second prediction unit for reference frame based on the motion vector.

4. The method of claim 2, wherein the inter-predicting of the attribute data comprises:
    configuring attribute data of a reconstructed point for the geometry data as an attribute of a predicted point of the attribute data.

5. The method of claim 3,
wherein the encoding the geometry data includes:
generating an error correction value based on a residual of a position value between a point for the current frame and a point for the reference frame and generating the predicted point based on the error correction value; or
generating an error correction value based on a residual of position values between points included in the first prediction unit for the current frame and the second prediction unit for the reference frame, and generating the predicted point based on the error correction value.

6. The method of claim 4, wherein the inter-predicting of the attribute data comprises:
generating an error correction value based on a residual of an attribute between a point included in the current frame and a point included in the reference frame, and generating attribute data of the predicted point based on the error correction value.

7. A device for encoding point cloud data, the device comprising:
an encoder configured to encode geometry data of point cloud data based on an inter-prediction,
wherein the geometry data is encoded based on a reference frame for the inter-prediction,
wherein the reference frame is generated based on global motion information,
wherein a value related to the geometry data is applied to a point in the reference frame;
encode attribute data of the point cloud data; and
a transmitter configured to transmit a bitstream containing the point cloud data,
wherein the bitstream includes parameter information related to a value for the inter-prediction,
wherein the encoder is further configured to:
generate an error correction value based on a difference in occupied bits between a first octree node of a current frame and a second octree node of the reference frame, and generating the predicted point based on the error correction value.

8. The device of claim 7,
wherein the encoder is further configured to inter-predict attribute data of the point cloud data.

9. The device of claim 7, wherein the encoder is further configured to:
based on frames including the point cloud data, generate, with reference to a point included in the current frame, a predicted point for a point included in the reference frame based on a motion vector; or
based on the frames including the point cloud data, generate, with reference to a point included in a first prediction unit for the current frame, a predicted point for a point included in a second prediction unit for the reference frame based on the motion vector.

10. The device of claim 8, wherein the encoder is further configured to:
configure attribute data of a reconstructed point for the geometry data as an attribute of a predicted point of the attribute data.

11. A method of decoding point cloud data, the method comprising:
receiving a bitstream containing point cloud data;
decoding geometry data of the point cloud data based on an inter-prediction,
wherein the geometry data is decoded based on a reference frame for the inter-prediction,
wherein the reference frame is generated based on global motion information,
wherein a value related to the geometry data is applied to a point in the reference frame;
decoding attribute data of the point cloud data,
wherein the bitstream includes parameter information related to a value for the inter-prediction,
wherein the decoding the geometry data includes:
generating an error correction value based on a difference in occupied bits between a first octree node of a current frame and a second octree node of the reference frame, and generating the predicted point based on the error correction value.

12. The method of claim 11, wherein the decoding of the point cloud data comprises:
inter-predicting attribute data of the point cloud data.

13. The method of claim 11, wherein the decoding the geometry data includes:
based on frames including the point cloud data, generating, with reference to a point included in the current frame, a predicted point for a point included in the reference frame based on a motion vector; or
based on the frames including the point cloud data, generating, with reference to a point included in a first prediction unit for the current frame, a predicted point for a point included in a second prediction unit for the reference frame based on the motion vector.

14. The method of claim 12, wherein the inter-predicting of the attribute data comprises:
configuring attribute data of a reconstructed point for the geometry data as an attribute of a predicted point of the attribute data.

15. The device of claim 13, wherein the decoding the geometry data includes:
generating an error correction value based on a residual of a position value between a point for the current frame and a point for the reference frame and generating the predicted point based on the error correction value; or
generating an error correction value based on a residual of position values between points included in the first prediction unit for the current frame and the second prediction unit for the reference frame, and generating the predicted point based on the error correction value.

16. A device for decoding point cloud data, the device comprising:
a receiver encoder configured to receive a bitstream containing point cloud data; and
a decoder configured to decode geometry data of the point cloud data based on an inter-prediction,
wherein the geometry data is decoded based on a reference frame for the inter-prediction,
wherein the reference frame is generated based on global motion information,
wherein a value related to the geometry data is applied to a point in the reference frame,
decode attribute data of the point cloud data,
wherein the bitstream includes parameter information related to a value for the inter-prediction,
wherein the decoder is further configured to:
generate an error correction value based on a difference in occupied bits between a first octree node of a current frame and a second octree node of the reference frame, and generating the predicted point based on the error correction value.

17. The device of claim 16,
wherein the decoder is further configured to inter-predict attribute data of the point cloud data.

18. The device of claim 16, wherein the decoder is further configured to:

based on frames including the point cloud data, generate, with reference to a point included in the current frame, a predicted point for a point included in the reference frame based on a motion vector; or based on the frames including the point cloud data, generate, with reference to a point included in a first prediction unit for the current frame, a predicted point for a point included in a second prediction unit for the reference frame based on the motion vector.

19. The device of claim 17, wherein the decoder is further configured to:

configure attribute data of a reconstructed point for the geometry data as an attribute of a predicted point of the attribute data.

20. The device of claim 18, wherein the decoder is further configured to:

generate an error correction value based on a residual of a position value between a point for the current frame and a point for the reference frame and generate the predicted point based on the error correction value; or generate an error correction value based on a residual of position values between points included in the first prediction unit for the current frame and the second prediction unit for the reference frame, and generate the predicted point based on the error correction value.

* * * * *